(12) United States Patent
Matsuda et al.

(10) Patent No.: US 9,588,401 B2
(45) Date of Patent: Mar. 7, 2017

(54) FIBER-REINFORCED LAMINATE, SHUTTER DEVICE AND CAMERA

(71) Applicant: CANON DENSHI KABUSHIKI KAISHA, Chichibu-shi (JP)

(72) Inventors: Kana Matsuda, Ohsato-gun (JP); Michiyo Hashizume, Chichibu (JP); Yuki Saito, Yokohama (JP); Mizuho Igawa, Chichibu (JP); Munetoshi Yoshikawa, Chichibu (JP); Michio Yanagi, Chichibu (JP); Yaomin Zhou, Hannou (JP)

(73) Assignee: CANON DENSHI KABUSHIKI KAISHA, Chichibu-shi (JP)

( * ) Notice: Subject to any disclaimer, the term of this patent is extended or adjusted under 35 U.S.C. 154(b) by 0 days.

(21) Appl. No.: 14/565,751

(22) Filed: Dec. 10, 2014

(65) Prior Publication Data
US 2015/0192836 A1 Jul. 9, 2015

(30) Foreign Application Priority Data

Jan. 8, 2014 (JP) .................................. 2014-001930
Mar. 28, 2014 (JP) .................................. 2014-070004
Oct. 28, 2014 (JP) .................................. 2014-219698

(51) Int. Cl.
*G03B 9/08* (2006.01)
*G03B 9/40* (2006.01)
(Continued)

(52) U.S. Cl.
CPC .................. *G03B 9/40* (2013.01); *B32B 15/08* (2013.01); *B32B 15/14* (2013.01); *G03B 9/00* (2013.01);
(Continued)

(58) Field of Classification Search
CPC combination set(s) only.
See application file for complete search history.

(56) References Cited

U.S. PATENT DOCUMENTS 4,029,838 A * 6/1977 Chamis ................. B29C 70/088
428/293.1
5,248,864 A * 9/1993 Kodokian ............... B29C 35/08
156/272.2
(Continued)

FOREIGN PATENT DOCUMENTS

CN 203084397 U 7/2013
JP 49-084232 A 8/1974
(Continued)

OTHER PUBLICATIONS

JP2003-280065 (A) Machine Translation, available from JPO website.*
(Continued)

*Primary Examiner* — Minh Phan
(74) *Attorney, Agent, or Firm* — Fitzpatrick, Cella, Harper & Scinto

(57) ABSTRACT

There is provided with a fiber-reinforced laminate. The fiber-reinforced laminate has a first fiber-reinforced layer and a second fiber-reinforced layer. The fiber-reinforced laminate also has a metal layer provided between the first fiber-reinforced layer and the second fiber-reinforced layer.

16 Claims, 5 Drawing Sheets

(51) Int. Cl.
    *B32B 15/14*     (2006.01)
    *B32B 15/08*     (2006.01)
    *G03B 9/00*     (2006.01)
    *G03B 9/18*     (2006.01)

(52) U.S. Cl.
    CPC . *G03B 9/08* (2013.01); *G03B 9/18* (2013.01); *B32B 2250/03* (2013.01); *B32B 2250/40* (2013.01); *Y10T 428/2495* (2015.01); *Y10T 428/24124* (2015.01); *Y10T 428/24132* (2015.01); *Y10T 428/24355* (2015.01); *Y10T 428/24612* (2015.01); *Y10T 428/31678* (2015.04)

(56) References Cited

U.S. PATENT DOCUMENTS

| | | | | |
|---|---|---|---|---|
| 5,797,055 | A | * | 8/1998 | Matsubara ............... G03B 9/40 396/484 |
| 2011/0250826 | A1 | * | 10/2011 | Yoon ....................... B24B 53/12 451/443 |
| 2011/0300358 | A1 | * | 12/2011 | Blohowiak ............... B32B 5/12 428/215 |

FOREIGN PATENT DOCUMENTS

| | | | |
|---|---|---|---|
| JP | 59-061827 | A | 4/1984 |
| JP | 60-65726 | U | 5/1985 |
| JP | 64-85749 | A | 3/1989 |
| JP | 10-186448 | A | 7/1998 |
| JP | 10-301158 | A | 11/1998 |
| JP | 2002-229097 | A | 8/2002 |
| JP | 2002-348646 | A | 12/2002 |
| JP | 2003-280065 | A | 10/2003 |
| JP | 2004284237 | A * | 10/2004 |
| JP | 2009-156969 | A | 7/2009 |

OTHER PUBLICATIONS

Partial English Language translation of JP 49-084232 (Aug. 13, 1974).

Extended European Search Report in European Application No. 14197955.9 (dated May 29, 2015).

* cited by examiner

F I G. 1
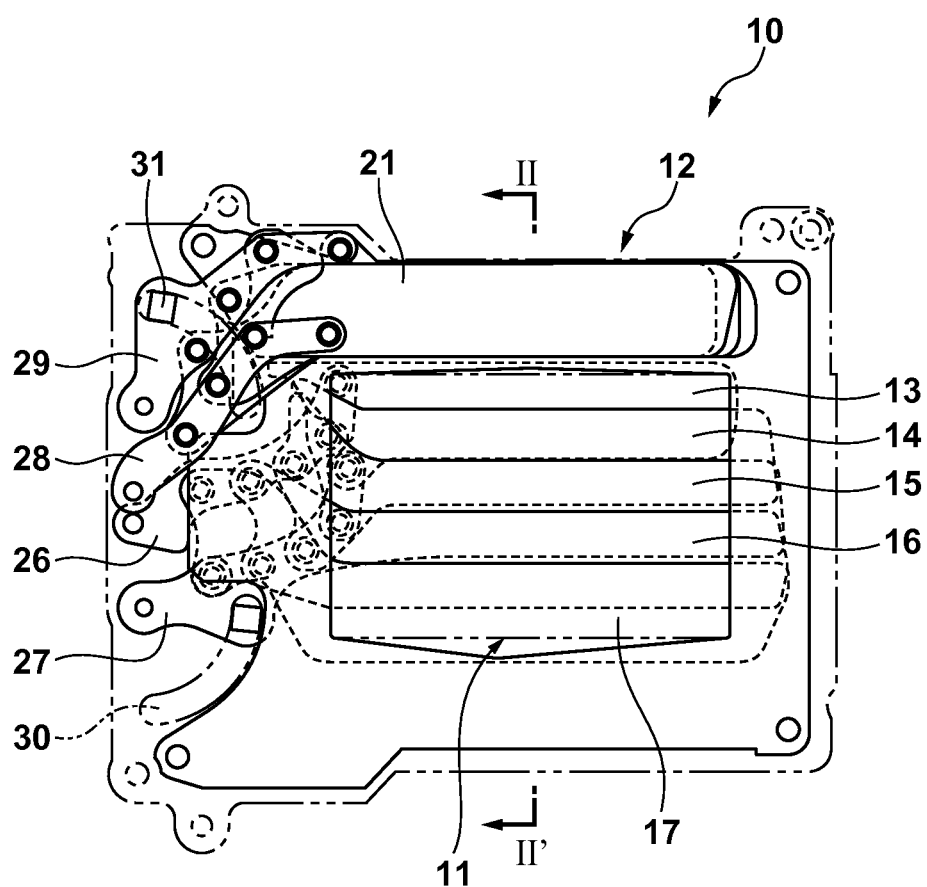

F I G. 6
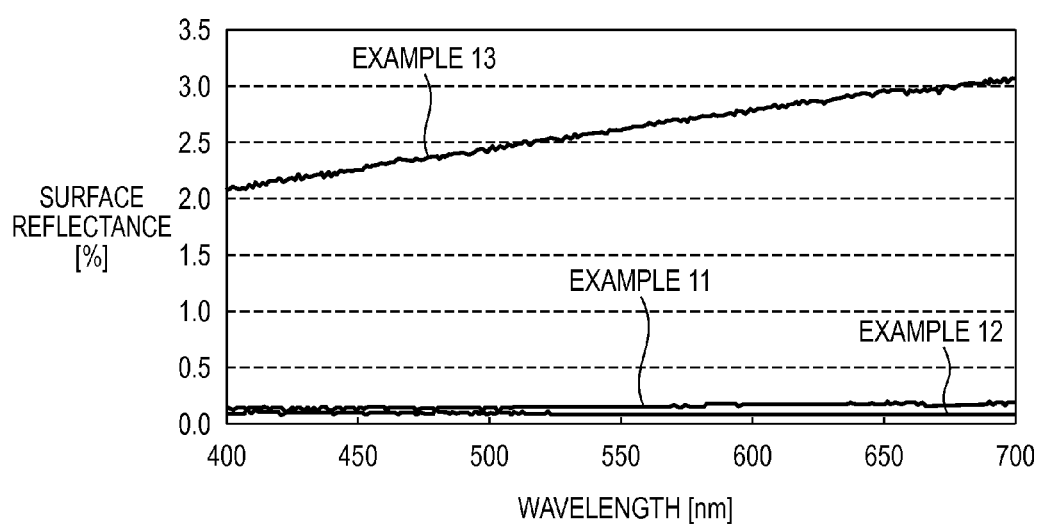

FIBER-REINFORCED LAMINATE, SHUTTER DEVICE AND CAMERA

BACKGROUND OF THE INVENTION

Field of the Invention

The present invention relates to a fiber-reinforced laminate, a shutter device, and a camera.

Description of the Related Art

In an optical path opening and shutting device such as a shutter or an aperture that opens and closes an optical path of an optical device such as a camera, shutter blades move and stop so as to cross the optical path over a very short time. In order to reduce the load of a driving source at that time, it is desired that the shutter blades are light, and in order to improve the durability, it is desired that the shutter blades have high strength and high rigidity.

Shutter blades made of a fiber-reinforced plastic film, shutter blades made of an aluminum plate material, and shutter blades made of an aluminum alloy plate material are known as conventional shutter blades.

Examples of the carbon fiber-reinforced plastic film include a sheet in which carbon fibers are used as reinforcing fibers and epoxy resin is used as a matrix material (matrix resin) (for example, Japanese Patent Laid-Open No. 49-084232). The carbon fiber-reinforced plastic film is lightweight, has high rigidity, and has lubricity. As the carbon fiber-reinforced plastic film, a prepreg sheet can be used. For example, a shutter blade using at least three prepreg sheets, in which adjacent sheets are laminated so that their fiber directions are orthogonal to each other, and a resin layer containing carbon black is provided between the prepreg sheets (Japanese Patent Laid-Open No. 10-301158).

SUMMARY OF THE INVENTION

According to an embodiment, a fiber-reinforced laminate comprises: a first fiber-reinforced layer; a second fiber-reinforced layer; and a metal layer provided between the first fiber-reinforced layer and the second fiber-reinforced layer.

According to another embodiment, a shutter device comprises: a base plate having an opening; one or more shutter blades configured to open and close the opening, a longitudinal direction of the shutter blade being substantially orthogonal to its moving direction; and a driving unit configured to drive the shutter blade, wherein at least one of the one or more shutter blades is the fiber-reinforced laminate comprising a first fiber-reinforced layer, a second fiber-reinforced layer, and a metal layer provided between the first fiber-reinforced layer and the second fiber-reinforced layer.

According to still another embodiment, a camera comprises a shutter device, wherein the shutter device comprises: a base plate having an opening; one or more shutter blades configured to open and close the opening, a longitudinal direction of the shutter blade being substantially orthogonal to its moving direction; and a driving unit configured to drive the shutter blade, wherein at least one of the one or more shutter blades is the fiber-reinforced laminate comprising a first fiber-reinforced layer, a second fiber-reinforced layer, and a metal layer provided between the first fiber-reinforced layer and the second fiber-reinforced layer.

Further features of the present invention will become apparent from the following description of exemplary embodiments (with reference to the attached drawings).

BRIEF DESCRIPTION OF THE DRAWINGS

FIG. 1 is a view showing a shutter device according to an embodiment.

FIG. 6 is a graph showing a spectral reflectivity of shutter blades in Examples 11 to 13.

DESCRIPTION OF THE EMBODIMENTS

Figure 2:
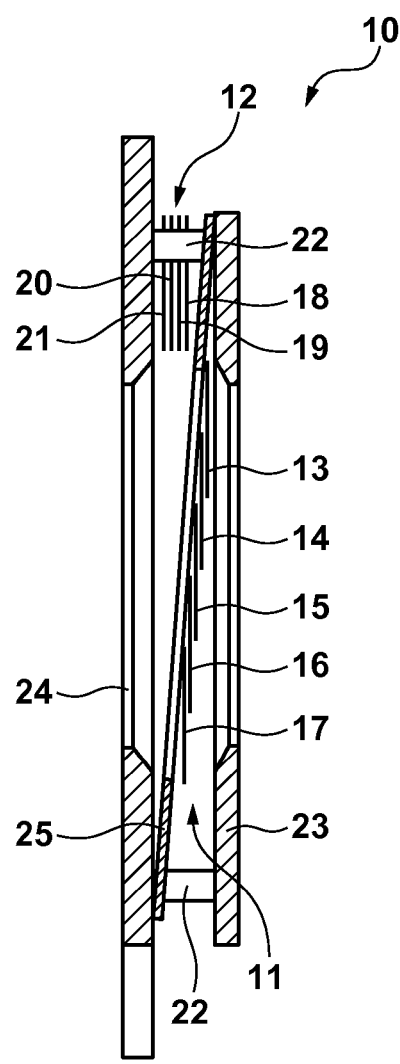
FIG. 2 is a cross sectional view taken along the line II-II' in FIG. 1 as seen in the direction of the arrows.

Shutter blades using a carbon fiber-reinforced plastic film have been problematic in that the thickness uniformity is poor and sufficient light shielding properties cannot be obtained. Therefore, the quality management of the shutter blades using a carbon fiber-reinforced plastic film is not easy, resulting in high cost due to a high failure rate, which is also a problem. There is a further problem in that an increase in thickness of shutter blades for improving the light shielding properties causes an increase in the weight of the shutter.

Some embodiments make it possible to achieve a fiber-reinforced laminate, a shutter blade, a shutter device, and a camera, which have sufficient light shielding properties and whose size and weight can be reduced.

The present invention relates to a fiber-reinforced laminate including a first fiber-reinforced layer, a second fiber-reinforced layer, and a metal layer provided between the first fiber-reinforced layer and the second fiber-reinforced layer, which will be described in the embodiments below. Such a fiber-reinforced laminate has sufficient light shielding properties while being lightweight, and thus can be used as a shutter blade material.

In one embodiment, the metal layer is made of a seamless metal sheet, so as to ensure sufficient light shielding properties of the fiber-reinforced laminate. In one embodiment, connecting layers are interposed between the metal layer and the first fiber-reinforced layer, and between the metal layer and the second fiber-reinforced layer. The connecting layers are layers provided between the metal layer and the fibers contained in the first fiber-reinforced layer and between the metal layer and the fibers contained in the second fiber-reinforced layer, so as to connect the metal layer and the fibers.

In one embodiment, the connecting layers bond the first fiber-reinforced layer and the second fiber-reinforced layer with the metal layer, and contain the same components as the resin composition holding the fibers of the first fiber-reinforced layer and the second fiber-reinforced layer. In this way, the first fiber-reinforced layer and the second fiber-reinforced layer are bonded with the metal layer using the same components as the resin composition holding the fibers of the first fiber-reinforced layer and the second fiber-reinforced layer, thereby allowing the adhesion strength to be improved. Further, a fiber-reinforced laminate having good planarity can be easily manufactured. Such a fiber-reinforced laminate can be manufactured by bonding the first fiber-reinforced layer and the second fiber-reinforced layer with the metal layer using an adhesive agent containing the same components as the resin composition holding the fibers of the first fiber-reinforced layer and the second fiber-reinforced layer. On the other hand, such a fiber-reinforced laminate can be obtained also by sandwiching the metal layer with prepreg sheets, which are obtained by impregnating the fibers with the resin composition, and subjecting them to pressure molding, as will be described below. The latter method is advantageous in that the fiber-reinforced laminate having good planarity is easily manufactured.

In one embodiment, such a connecting layer includes at least one of a metal oxide layer containing the element of the metal layer and a resin composition layer. Here, the resin composition layer included in the connecting layer, for example, is a layer having the same components as the resin composition (such as the matrix resin) that holds the fibers of the first fiber-reinforced layer and the second fiber-reinforced layer. The resin composition layer may be formed integrally with the first fiber-reinforced layer or the second fiber-reinforced layer that is adjacent thereto. This can enhance the connection strength between the first fiber-reinforced layer and the metal layer, and the connection strength between the second fiber-reinforced layer and the metal layer.

It is easy to obtain a metal layer having good planarity, as compared to obtaining the fiber-reinforced layers. For example, a light metal member made of a rolled material has a uniform in-plane thickness distribution as compared to CFRP prepreg sheets. Accordingly, use of the metal layer is advantageous for fabricating a shutter blade having high planarity. In one embodiment, the thickness of the metal layer is at least 10 µm, at least 15 µm in another embodiment, and at least 20 µm in a further embodiment, in order to ensure the planarity. In the case of using a thin metal foil, such as in the case of using a metal foil that is sufficiently thin as compared to the diameter of the fibers in the fiber-reinforced layers, the metal foil may possibly deform along the shape of the fibers in compression molding. On the other hand, use of a metal layer having a sufficient thickness prevents deformation of the metal layer, thereby making it easier to ensure the planarity of the fiber-reinforced laminate. From such a viewpoint, a metal layer having a thickness larger than 50% of the diameter of the fibers in the fiber-reinforced layers is used in one embodiment, and a metal layer having a thickness larger than the diameter of the fibers in the fiber-reinforced layers is used in another embodiment. Further, in one embodiment, the thickness of the metal layer is selected so that the metal layer in the fabricated fiber-reinforced laminate is flat, for example, so that the center line surface roughness Ra is not more than 10 nm.

Further, in the case where the fiber-reinforced layers are molded by heat treatment, the viscosity of the matrix resin contained in the fiber-reinforced layers (or the prepreg sheets as their precursors) is reduced. Providing the metal layer as an interlayer prevents fluidization, over the metal layer, of the matrix resin of the fiber-reinforced layers that sandwich the metal layer from both sides. Therefore, uneven distribution of the matrix resin in one of the fiber-reinforced layers is suppressed, that is, the ratio of the matrix resin and the carbon fibers in the respective fiber-reinforced layers is made uniform. As a result, the symmetry of the thickness of the respective fiber-reinforced layers can be ensured, and therefore warpage caused by thickness asymmetry can be suppressed. Also for this reason, a shutter blade having good planarity can be formed by using the fiber-reinforced laminate according to this embodiment. As described above, use of the fiber-reinforced laminate according to this embodiment makes it possible to realize a shutter blade, a camera shutter, and a camera having good planarity and excellent optical properties while suppressing an increase in plate thickness.

A fiber-reinforced laminate according to one embodiment has a structure in which the metal layer is interposed between the first fiber-reinforced layer and the second fiber-reinforced layer. The metal layer herein is a base substrate that functions substantially as a core material of the fiber-reinforced laminate. That is, the metal layer substantially functions as a core material between the first fiber-reinforced layer and the second fiber-reinforced layer, and functions also as a base substrate to which the first fiber-reinforced layer and the second fiber-reinforced layer are attached. Accordingly, the metal layer not only functions as an intermediate material between the first fiber-reinforced layer and the second fiber-reinforced layer, but also serves as a matrix to keep the overall posture of the fiber-reinforced laminate flat.

When a fiber-reinforced laminate having such a configuration is used as a shutter blade of a camera, the metal layer functions as a core material of each fiber-reinforced layer, and therefore waving deformation that occurs in the shutter blade with its movement (that is, with the traveling of the shutter blade) can be effectively suppressed. Therefore, such a configuration is effective in order to stabilize the traveling posture of the shutter blade. Further, such a configuration can enhance the strength of the shutter blade with respect to the tensile stress. Further, each fiber-reinforced layer functions as a reinforcement layer for enhancing the surface strength of the metal layer, thereby allowing sufficient rigidity to be obtained and sufficient durability to be ensured in repetitive driving (for example, in continuous driving of the shutter blade).

As described above, the first fiber-reinforced layer or the second fiber-reinforced layer is connected to the surface of the metal layer, and serves to enhance the surface strength of the metal layer. Therefore, when the aforementioned fiber-reinforced laminate is used as a shutter blade of a camera, the connection strength with a member connected to the shutter blade is improved. For example, the connection strength, with the shutter blade, of a shaft member configured to support a drive arm that is rotatably connected thereto can be enhanced. Further, even in the case where the shutter blade is continuously driven, the surface strength of the metal layer is improved, and therefore sufficient rigidity can be ensured in the connected portion with the member connected to the shutter blade.

Further, in order to enhance the connection strength between the metal layer and the first fiber-reinforced layer, and between the metal layer and the second fiber-reinforced layer, a plurality of recesses can be provided on a surface layer of the metal layer. For example, a surface treated layer having a plurality of micro recesses constituting a part of the connecting layer may be provided on a surface layer (on a surface) of the metal layer, for example, on at least one of two surface sides of the metal layer. It should be noted that the surface treated layer may be provided also on the end face of the metal layer. In this case, the resin composition holding the fibers of at least one of the first fiber-reinforced layer and the second fiber-reinforced layer can enter into the recesses. For example, at least a part of the resin composition layer constituting a part of the connecting layer (connecting component) can enter into the micro recesses of the aforementioned surface treated layer so as to be embedded therein and integrated therewith. Thus, a plurality of anchor points are formed at the interfaces between the metal layer and the first fiber-reinforced layer, and between the metal layer and the second fiber-reinforced layer, specifically, at the boundary portions between the metal layer and the connecting layers, between the first fiber-reinforced layer and the connecting layer, and between the second fiber-reinforced layer and the connecting layer, as a result of which the connection strength between them is enhanced by the anchor effects. Accordingly, since a part of the connecting layer is embedded in the aforementioned surface treated layer, the surface treated layer substantially constitutes a part of the connecting layer as a connection reinforcing layer (adhesion reinforcing layer).

Further, the aforementioned surface treated layer of the metal layer can be a blackened layer. This is because it is advantageous as a fiber-reinforced laminate, for example, serving as a structure of a shutter blade for light shielding (light blocking). A black component such as carbon black may be contained in the first fiber-reinforced layer or the second fiber-reinforced layer, or the light shielding effect may be improved by applying black paint to a surface of the first fiber-reinforced layer or the second fiber-reinforced layer. It should be noted that blackening can be performed also by applying staining to the metal layer after the metal layer is oxidized. For example, after a porous film is formed on the metal layer, the porous film can be stained by immersing the metal layer in a black staining solution, or the like. Thus, the light shielding properties of the porous film can be further enhanced. As a black staining solution, known staining solutions can be used. For example, acid azo dyes of metal complex type obtained by complexation of metal such as chromium or cobalt with an acid azo dye can be used.

Further, in the present invention, the surface treated layer of the aforementioned metal layer may be a layer formed, for example, by subjecting the surface of the metal layer to anodization or chemical conversion. Thus, the surface of the metal layer is transformed into a micro roughened surface by electrolytic treatment or chemical treatment, as a result of which the connection surface between the surface treated layer and the resin composition layer in the aforementioned connecting layer increases, thereby allowing high connection strength to be achieved. At this time, the oxidized surface of the surface treated layer formed by anodization of the surface of the metal layer forms an interface of the connecting layer with the resin composition layer, and the oxidized surface transformed into a micro roughened surface substantially increases the surface area. Therefore, the connecting component (such as resin component) holding the fibers of the first fiber-reinforced layer or the second fiber-reinforced layer easily penetrates (flows into) the micro roughness, for example, thereby allowing high connection strength to be ensured due to the aforementioned anchor effects.

In anodization, electrolysis can be performed, for example, using an organic acid electrolyte (such as sulfuric acid, oxalic acid, or phosphoric acid) with the metal layer (such as aluminum alloy) serving as an anode. The generated oxygen is bonded to the metal layer, thereby allowing a porous oxide film to be formed on the metal layer.

Further, the surface treated layer formed by applying anodization or chemical conversion to the surface of the metal layer mainly contains a metal oxide having the element of the metal layer, and forms a layer where the material is harder compared to the metal layer (matrix). As a result, further improvement in rigidity as the fiber-reinforced laminate that is a final product can be ensured. As a result, for example, in the case where the fiber-reinforced laminate is applied to a shutter blade, the warpage of the shutter blade that occurs when the shutter blade travels in a shutter unit is reduced, so that the traveling stability of the shutter blade during driving is improved and the durability of the shutter blade is also improved.

The thickness of the aforementioned surface treated layer, for example, is about 1 to 8 μm. When the thickness is about 1 to 3 μm, good adhesion can be obtained, and the thickness can be 3 to 6 μm in order to further improve the adhesion between the layers. It should be noted that the adhesion may be enhanced by applying a silane coupling agent or a primer, as a surface treatment, to both surfaces of the metal layer, or the surfaces of the first fiber-reinforced layer and the second fiber-reinforced layer on the sides that are connected to the metal layer, in advance, instead of applying the aforementioned oxidation treatment, or after applying the oxidation treatment.

Further, in the case where the fiber-reinforced laminate is used as a shutter blade, the end face of the fiber-reinforced laminate can be blackened. In this case, unnecessary light reflection on the end face of the fiber-reinforced laminate (specifically, the end face of the metal layer) can be suppressed. In this way, a surface treatment can be applied not only to the surfaces of the metal layer but also to the end face of the metal layer.

In the case where a surface treatment is applied to both surfaces of the metal layer, the same surface treatment as the surface treatment applied to both surfaces of the metal layer may be applied to the end face of the metal layer, in consideration of the efficiency of the manufacturing process. Such a treatment to the end face of the metal layer may be applied to the end face of the metal layer after the fiber-reinforced layers are respectively connected to both surfaces of the metal layer, or the fiber-reinforced layers may be connected to both surfaces of the metal layer after the surface treatment is applied to both surfaces and the end face of the metal layer. In the interest of rigidity reinforcement, such a treatment to the end face of the metal layer may be applied to the entire circumference of the metal layer, or in the interest of light reflection, it may be applied only to the end face exposed to light. It should be noted that the rigidity of the metal layer (shutter blade as a final product) can be reinforced by applying the treatment to the end face of the metal layer so as to provide a surface treated layer thereon that is substantially continuous with the surface treated layers formed on both surfaces of the metal layer.

Examples of the blackening process include anodization and black staining (for example, acid azo dyes of metal complex type, or the like, can be used as a black staining solution), which may be appropriately adjusted depending on the material of the metal layer, or the like, and may be used solely or in combination.

Here, the first fiber-reinforced layer and the second fiber-reinforced layer described above may have substantially the same thickness in consideration of the stress balance as a laminate. The thickness of the first fiber-reinforced layer or the second fiber-reinforced layer can be adjusted by appropriately changing the diameter (fineness) or the number of fibers to be contained therein, or can be adjusted also by appropriately changing the amount of the component (connecting component) holding the fibers. Further, the first fiber-reinforced layer and the second fiber-reinforced layer described above may have substantially the same fiber density in consideration of the stress balance as a laminate.

Further, the thickness of the first fiber-reinforced layer or the second fiber-reinforced layer can be greater than or equal to the thickness of the aforementioned metal layer, in order to ensure the rigidity of the fiber-reinforced laminate.

Further, a reduction in the overall thickness of the fiber-reinforced laminate or a reduction in weight per unit area can be achieved by reducing the thickness of each of the fiber-reinforced layers and further relatively reducing the thickness of the metal layer. On the other hand, when the thickness of the metal layer is increased, the weight of the fiber-reinforced laminate as a whole is increased. Therefore, the total thickness of the first fiber-reinforced layer and the second fiber-reinforced layer can be set larger than the thickness of the metal layer.

That is, at least one or all of the following relational expressions (1) to (4), for example, can be satisfied, where the thickness of the metal layer is denoted by X, the thickness of the first fiber-reinforced layer is denoted by Y1, and the thickness of the second fiber-reinforced layer is denoted by Y2.

$$Y1 = Y2 \quad (1)$$

$$X < (Y1 + Y2) \quad (2)$$

$$X \leq Y1 \quad (3)$$

$$X \leq Y2 \quad (4)$$

It should be noted that the thickness of the metal layer may be 10 μm to 50 μm, and further may be 15 μm to 30 μm, for example, when an aluminum alloy or magnesium alloy is used. This is because, if the thickness of the metal layer is excessively small, the rigidity of the fiber-reinforced laminate and the flatness (planarity) of the metal layer decrease, resulting in warpage of a shutter blade due to traveling at high speed, for example, in the case of being applied to the shutter blade, or a decrease in resistance to the collision with other members. This is also because although the rigidity will be enhanced, an excessively large thickness of the metal layer is not advantageous for weight reduction, which is not advantageous for high-speed traveling, for example, in the case of being applied to a shutter blade. In addition, cracks that occur when a hole is opened in the shutter blade for providing a dowel, or the like, can be prevented by increasing the thickness of the metal layer, for example, to be 10 μm or more.

It should be noted that the material of the metal layer can be a light metal that is lightweight and has a high strength, in view of the aforementioned circumstances. For example, duralumin, super duralumin, and extra super duralumin, which are materials having high rigidity, can be used. Further, in the case of using a magnesium-based alloy, a material that can be rolled, or that is suitably subjected to plastic working, such as Mg—Al—Zn, Mg—Zn—Zr, and Mg—Li—Al, can be used.

Further, the first fiber-reinforced layer and the second fiber-reinforced layer sandwiching the aforementioned metal layer can be carbon fiber-reinforced sheets. The thickness thereof is 10 to 80 μm in one embodiment, and is 15 to 40 μm in another embodiment. For example, an excessively large thickness of the carbon fiber-reinforced sheets forming the first and second fiber-reinforced layers is not advantageous for achieving light weight, whereas an excessively small thickness of the carbon fiber-reinforced sheets tends to cause exposure of the carbon fibers from the matrix resin covering the fibers, or non-uniform distribution of the carbon fibers, which is not advantageous in view of the strength. Further, the thickness of the carbon fiber-reinforced sheets needs to be considered in application to a shutter blade so as to ensure high-speed traveling or rigidity.

It should be noted that the thickness of the connecting layers interposed between the metal layer and the first fiber-reinforced layer, and between the metal layer and the second fiber-reinforced layer, for example, when including the aforementioned surface treated layers formed on the surfaces of the metal layer, is about 4 to 8 μm.

In particular, in the case where the fiber-reinforced laminate is used as a shutter blade, a reduction in the weight of the fiber-reinforced laminate is desired. For example, the weight of the shutter blade can be reduced by making the metal layer thinner than the first fiber-reinforced layer and the second fiber-reinforced layer. Further, the weight of the shutter blade can be further reduced by fabricating the metal layer that is sandwiched by the first and second fiber-reinforced layers using a light metal material. Thus, it is possible to obtain a lightweight shutter blade, while ensuring the light shielding properties of the shutter blade.

In the shutter blade having the aforementioned configuration, letting [ρ1] be the average density of the first and second fiber-reinforced layers, and [ρ2] be the average density of the metal layer, it is advantageous for reducing the weight that the thickness of the metal layer is less than (ρ1/ρ2) times the thickness of the first and second fiber-reinforced layers. For example, setting the density of the metal layer to about 2 to 3 g/cm³ or lower is effective for reducing the weight of the shutter blade and ensuring the strength thereof. Further, using a rolled material made of aluminum alloy as the material of the metal layer is advantageous for reducing the weight. Further, it is advantageous that the metal layer has surface treated layers obtained by anodization, or the like, on both of its surfaces. The rigidity of the metal layer is enhanced by the surface treatment, and therefore the thickness of the metal layer can be further reduced, thereby allowing a further reduction in the weight of the shutter blade.

The average density [ρ1] of the first and second fiber-reinforced layers is determined by a relational expression: A×(1−(C/100))+(B×C). Here, the density of the fibers in the first and second fiber-reinforced layers is denoted by [A] (g/cm³), and the density of a holding material (such as a matrix resin) that holds the fibers is denoted by [B] (g/cm³). Further, the content of the aforementioned holding material contained in the first and second fiber-reinforced layers is denoted by [C] (wt %). According to the relational expression, the thickness of the first and second fiber-reinforced layers is denoted by [T1] (μm), and the thickness [T2] (μm) of the metal layer is set to less than T1×(ρ1/ρ2) (μm), thereby allowing a sufficient reduction in weight of the shutter blade.

Further, in addition to the aforementioned configuration, the direction of the fibers contained in the first fiber-reinforced layer and the direction of the fibers contained in the second fiber-reinforced layer can be set to substantially the same direction, in the present invention. This is because the alignment of the fiber directions makes it possible to enhance the rigidity in one direction (direction orthogonal to the fiber direction) and to ensure the flatness (planarity) of the fiber-reinforced laminate, though the stress balance is made consistent in all directions when the fiber directions intersect each other. The alignment of the fiber directions makes it possible to enhance the rigidity in one direction (direction parallel to the fiber direction) while ensuring the flatness (planarity) of the fiber-reinforced laminate that is necessary for a shutter blade.

It should be noted that the aforementioned metal layer, for example, may be a light metal layer, and can be aluminum alloy or magnesium alloy, for example. This is because such an alloy makes it possible to adjust the rigidity by the composition of the metal component, while it is lightweight. In particular, a rolled sheet material can be used as the metal layer, in the interest of productivity, or the like. In this case, the fiber directions of the first fiber-reinforced layer and the second fiber-reinforced layer described above can be allowed to intersect the rolling direction of the metal layer, or to be orthogonal thereto, and further, the rolling direction of the metal layer can be allowed to intersect, and in particular, be orthogonal to the fiber directions of the first fiber-reinforced layer and the second fiber-reinforced layer that are aligned in one direction as described above. It is advantageous for ensuring the balance of flatness (planarity) in the plane of the blade material in the fiber directions and in a direction orthogonal to the fiber directions.

In another embodiment, the first fiber-reinforced layer or the second fiber-reinforced layer is connected to the metal layer with its fiber direction being inclined from the longitudinal direction of the fiber-reinforced laminate. In a further embodiment, the first fiber-reinforced layer and the second fiber-reinforced layer are both connected to the metal layer with their fiber directions being inclined from the longitudinal direction. In one embodiment, the fiber-reinforced laminate is a strip-shaped thin plate. The fiber-reinforced laminate of such an embodiment can be used as a shutter blade of a focal plane shutter, or the like. In this case, the first fiber-reinforced layer or the second fiber-reinforced layer is connected to the metal layer with its fiber direction being inclined from the longitudinal direction of the strip-shaped thin plate. In a further embodiment, the first fiber-reinforced layer or the second fiber-reinforced layer is connected to the metal layer with its fiber direction extending in a direction at a predetermined angle with respect to the longitudinal direction of the strip-shaped thin plate. When the shutter blade is repeatedly driven at high speed, various deformation stresses are applied to the shutter blade. Such stresses applied to the shutter blade may cause the fibers arranged in the vicinity of the end face of the shutter blade to become loose (become lost) in some cases. However, according to this configuration, the fiber direction intersects the edge of the strip-shaped thin plate, and thus fuzziness at the end of the shutter blade resulting from the loss of the fibers at the edge of the shutter blade can be effectively reduced. The angle of the fiber direction with respect to the longitudinal direction of the strip-shaped thin plate is not specifically limited, but can be 10 degrees or more, for example, in order to effectively reduce the loss of the fibers. Further, the angle can be 20 degrees or less, in order to secure appropriate rigidity of the fiber-reinforced laminate.

Further, in one embodiment, the fiber direction of the first fiber-reinforced layer and the fiber direction of the second fiber-reinforced layer intersect each other in plan view in the thickness direction of the strip-shaped thin plate. For example, the fiber direction of the first fiber-reinforced layer in the longitudinal direction of the strip-shaped thin plate and the fiber direction of the second fiber-reinforced layer in the longitudinal direction of the strip-shaped thin plate substantially intersect each other with the metal layer being interposed. In a specific embodiment, the angle of the fiber direction of the first fiber-reinforced layer with respect to the longitudinal direction of the strip-shaped thin plate is +10° to +20° in plan view in the thickness direction of the strip-shaped thin plate. On the other hand, the angle of the fiber direction of the second fiber-reinforced layer with respect to the same longitudinal direction is −10° to −20°. Such a configuration is advantageous, when the shutter blade is continuously driven, for keeping the traveling posture stable even if various stresses are applied thereto, while effectively reducing the loss of the fibers as described above.

Further, the fibers used for the first fiber-reinforced layer and the second fiber-reinforced layer described above may be carbon fibers, where the first fiber-reinforced layer and the second fiber-reinforced layer, for example, can be carbon fiber-reinforced resin layers. Use of carbon fibers leads to light weight and high rigidity, which is very effective.

In one embodiment, at least one of the first fiber-reinforced layer and the second fiber-reinforced layer has a reflection reduction layer on a surface on the opposite side of the metal layer. The reflection reduction layer is a layer that reduces light reflection. Since light reflection on the surface of the fiber-reinforced layer can be reduced by providing the reflection reduction layer, the fiber-reinforced laminate is more advantageously used as a material of a shutter blade. In one embodiment, the fiber-reinforced layer provided with a reflection reduction layer has reflection properties as low as those of the fiber-reinforced layer provided with a black coating film.

In one embodiment, the reflection reduction layer is a layer having a roughness pattern provided on the surface of the fiber-reinforced layer. For example, the reflection reduction layer can be a layer of the matrix resin having a predetermined center line average roughness Ra, and covering the carbon fibers on the surface of the fiber-reinforced layer. Here, the center line average roughness Ra is a center line average roughness Ra of the matrix resin measured along a single carbon fiber. More specifically, the center line average roughness Ra indicates a microscopic center line average roughness Ra of the laminated matrix resin on the surface of the single fiber arranged on the outermost layer of the fiber-reinforced layer.

In the fiber-reinforced layer, the carbon fibers aligned in one direction are generally impregnated with the matrix resin. Accordingly, roughness is present between the carbon fibers on the surface of the fiber-reinforced layer. For example, when the carbon fibers have a diameter of 5 to 8 μm, roughness corresponding to the diameter is present. Accordingly, if the center line average roughness Ra is measured without giving consideration to the orientation of the carbon fibers, the roughness between the carbon fibers is reflected in a macroscopic center line average roughness Ra that is obtained. On the other hand, a microscopic center line average roughness Ra can be measured by measuring, along a single carbon fiber, the center line average roughness Ra of the matrix resin covering the carbon fibers. According to the studies by the inventors, light reflection on the surface of the fiber-reinforced layer can be reduced by forming a micro roughness pattern along a single carbon fiber, that is, by controlling the microscopic center line average roughness Ra.

Figure 5:
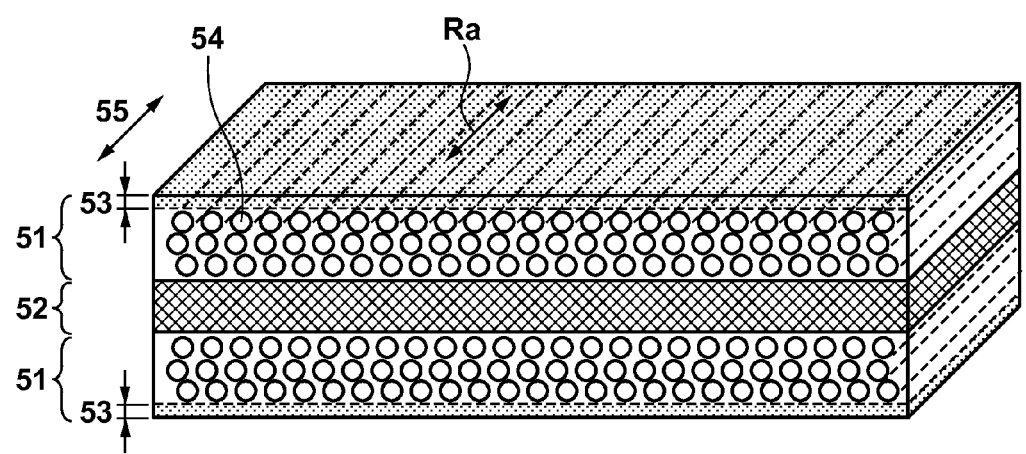
FIG. 5 is a view for explaining a method for measuring a center line average roughness Ra.

With reference to FIG. 5, the microscopic center line average roughness Ra will be further described. FIG. 5 shows a fiber-reinforced laminate including a metal layer 52 and a fiber-reinforced layer 51. The fiber-reinforced layer 51 has a plurality of fibers 54 arrayed along a fiber direction 55. Further, the fiber-reinforced layer 51 has a reflection reduction layer 53 on its surface. In this embodiment, the microscopic center line average roughness Ra indicates a value obtained by measuring the center line average roughness Ra of the reflection reduction layer 53 along the surface of a fiber 54.

In this way, surface reflection can be reduced by controlling the roughness pattern on the surface of the matrix resin covering the surface of one fiber. As a result, it is possible to fabricate a shutter blade that has sufficient optical performance and is usable in an image capturing apparatus equipped with an imaging device having an improved resolution due to an increased number of pixels.

The center line average roughness Ra of the reflection reduction layer is at least 10 nm in one embodiment, and at least 30 nm in a further embodiment. Further, it is not more than 300 nm in one embodiment, and not more than 200 nm in a further embodiment. When the value of the center line average roughness Ra is at least 10 nm, the surface of the fiber-reinforced layer can be prevented from being a mirror surface, and low reflectance, which is desirable in a shutter blade, can be improved. Further, when the value of the center line average roughness Ra is not more than 300 nm, the mechanical strength of the projections is improved, so that dust to be caused by the loss of the projections when shutter blades contact each other can be prevented.

In one embodiment, at least one of the first fiber-reinforced layer and the second fiber-reinforced layer has a friction reduction layer on the surface on the opposite side of the metal layer. The friction reduction layer is a layer formed so as to reduce the sliding resistance. In one embodiment, a layer on the surface of which a plurality of projections are formed is used as the friction reduction layer. The contact area between the shutter blades during driving can be reduced by forming such a friction reduction layer, so that the sliding resistance can be reduced. As a result, the shutter blades can be driven by a lower driving force.

In one embodiment, the aspect ratio of a projection formed on the friction reduction layer is less than 1. The aspect ratio is a value of Y/X, where the width of the projection is denoted by X, and the height thereof is denoted by Y. Here, the width X of the projection means the shortest spacing between two parallel straight lines circumscribing a plan view image of the projection. Further, the height Y of the projection means the distance from the surface of the fiber-reinforced layer to the distal end of the projection. When the aspect ratio of the projection is less than 1, the mechanical strength of the projection can be ensured, and thus the loss of the projection during driving can be prevented. As a result, the occurrence of dust that causes adverse effects on a captured image can be suppressed.

The friction reduction layer may be a layer made of a material different from that of the matrix resin, or may be a layer of the matrix resin contained in the fiber-reinforced layer.

The shape of the projection is not specifically limited, and it can be circular, elliptical, or polygonal, for example. Also, the size and height (protrusion length) of the projection, and the pitch between the projections are not specifically limited. In one embodiment, the diameter, diagonal line, or width of the projection in plan view can be about 100 µm or more and about 500 µm or less. Further, the pitch between the projections can be about 50 µm or more and about 300 µm or less. Further, the height (protrusion length) of the projection can be about 2 µm or more and about 10 µm or less.

Figure 8:
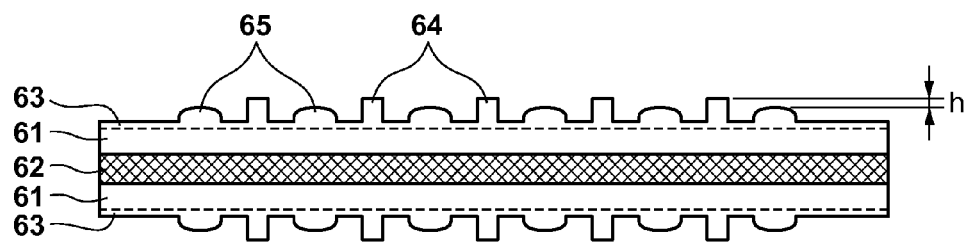
FIG. 8 is a view showing an example of friction reduction layers.
Figure 9:
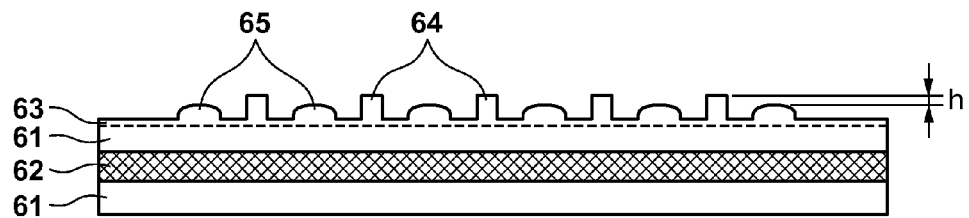
FIG. 9 is a view showing an example of a friction reduction layer.

The friction reduction layer may be formed on both surfaces of the fiber-reinforced laminate as shown in FIG. 8, or may be formed on one side of the fiber-reinforced laminate as shown in FIG. 9, depending on the specifications of the shutter device. In the case of using shutter blades having one side on which the friction reduction layer is formed, as in FIG. 9, the sliding resistance can be further reduced by assembling the shutter blades into a shutter device so that a surface on which the friction reduction layer is formed and a surface on which the friction reduction layer is not formed are in contact with each other.

Figure 7:
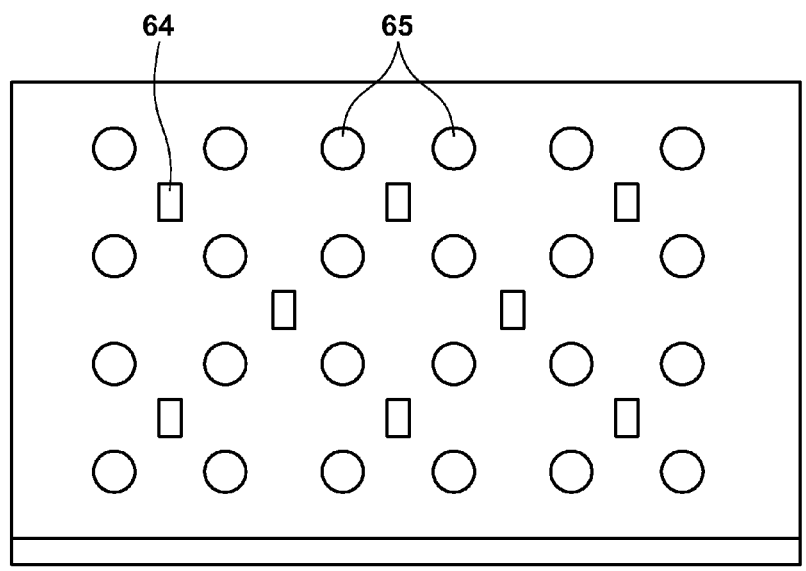
FIG. 7 is a view showing an example of a friction reduction layer.

FIG. 7 shows an example of a friction reduction layer 63. In the example of FIG. 7, projections 64 having a first shape and projections 65 having a second shape are provided on the surfaces of fiber-reinforced layers 61 sandwiching a metal layer 62. Hereinafter, on the surfaces of the fiber-reinforced layers, a plurality of projections having the first shape are referred to as pattern A, and a plurality of projections having the second shape are referred to as pattern B. The pattern A is composed of a plurality of projections having the same height. In the example of FIG. 7, the height of the projections is different between the pattern A and the pattern B. In one embodiment, the height of the projections of the pattern A can be about 4 µm or more and about 10 µm or less. Further, the height of the projections of the pattern B can be about 2 µm or more and about 8 µm or less. In one embodiment, in order to obtain a good friction reduction layer, the difference in height between the projections of the pattern A and the projections of the pattern B is about 2 µm or more and 6 µm or less.

FIGS. 8 and 9 show cross sectional views of fiber-reinforced laminates having friction reduction layers as an example. FIG. 8 shows an example in which friction reduction layers are provided on both fiber-reinforced layers of the fiber-reinforced laminate. FIG. 9 shows an example in which a friction reduction layer is provided on one of the fiber-reinforced layers of the fiber-reinforced laminate. As shown in FIGS. 8 and 9, the height of the projections of the pattern A is higher than the height of the projections of the pattern B by h.

When shutter blades are driven as blades of a focal plane shutter, the shutter blades slide while the surfaces of a plurality of the shutter blades are in contact with each other. When the friction reduction layers shown in FIG. 7 are provided, the projections of the pattern A, which is higher, preferentially contact other shutter blades. On the other hand, the projections of the pattern B, which is lower, are less likely to be in contact with other shutter blades. Further, according to the example of FIG. 7, the projections of the pattern A are fewer in number than the projections of the pattern B. Therefore, the number of projections that contact the other shutter blades when the shutter is driven is reduced, thus allowing the sliding resistance to be reduced. As a result, the shutter blades can be driven with a lower driving force. Further, the number of the projections of the pattern A is small, which reduces the frequency at which at least a part of the projections is lost due to the contact between the shutter blades during driving so as to generate fragments. Therefore, dust caused by the contact between the shutter blades can be effectively suppressed. On the other hand, a fiber-reinforced laminate with high planarity is made easy to obtain by providing the projections of the pattern B, since the matrix resin that is excessive due to uneven distribution can be released toward the projections of the pattern B when the fiber-reinforced laminate is formed by compression molding.

The fiber-reinforced laminate can be fabricated, for example, by laminating the first fiber-reinforced layer, the metal layer, and the second fiber-reinforced layer, in the stated order. For example, the fiber-reinforced laminate can be fabricated by laminating the fiber-reinforced resin layers that are uncured or semi-cured and the metal layer so that the fiber-reinforced resin layers sandwich the metal layer, and curing the resin. In this case, a resin composition layer is present between the metal layer and the fibers contained in the first fiber-reinforced layer, and the resin composition layer is made of resin composition which is used for holding the fibers of the first fiber-reinforced layer. The resin composition layer constitutes a part of the connecting layer, and is formed integrally with the first fiber-reinforced layer, particularly with the portion of the resin composition that holds the fibers of the first fiber-reinforced layer. Likewise, a resin composition layer is present between the metal layer and the fibers contained in the second fiber-reinforced layer, and the resin composition layer is made of resin composition which is used for holding the fibers of the second fiber-reinforced layer.

Further, the lamination can be performed after a surface treated layer having a plurality of micro recesses constituting a part of the connecting layer is provided on the surface of the metal layer, which allows at least a part of the resin composition layer constituting a part of the connecting layer to be embedded in the micro recesses on the surface treated layer.

It should be noted that the aforementioned fiber-reinforced laminate of the present invention is suitably used in applications that require thinness and lightweight properties, and can be used, for example, for shutter blades of a camera. Accordingly, the present invention contributes to an improvement in performance of a camera provided with a shutter device, for example, having a base plate in which an opening is formed, at least one shutter blade that opens and closes the opening and has a longitudinal direction that is substantially orthogonal to its moving direction, and a driving unit that drives the shutter blade, in which the aforementioned fiber-reinforced laminate can be applied to at least one of the at least one shutter blade.

Hereinafter, a shutter blade according to one embodiment, serving as a structure to which the aforementioned fiber-reinforced laminate of the present invention is applied, and a shutter device (optical path opening and shutting device) that uses such shutter blades will be described with reference to the drawings. However, the present invention is not limited to the following embodiments, and all modifications and variations can be made according to the concepts of the present invention as described in the scope of the appended claims. That is, the present invention is applicable to other techniques without departing from the spirit of the present invention.

FIG. 1 shows a shape of a front surface of a shutter device according to this embodiment. A shutter device 10 shown in FIG. 1 is a focal plane shutter unit. Further, FIG. 2 is a cross sectional view taken along the line II-II' in FIG. 1 as seen in the direction of the arrows. The focal plane shutter unit 10 according to this embodiment is a so-called vertically movable type. That is, the focal plane shutter unit 10 has a first curtain 11 and a second curtain 12 that move upward and downward, and an opening of a shutter base plate 24 is opened and closed using the first curtain 11 and the second curtain 12. The first curtain 11 and the second curtain 12 are composed of at least one shutter blade. Specifically, the first curtain 11 is composed of five shutter blades 13, 14, 15, 16, and 17 overlapping each other, and the second curtain 12 is composed of four shutter blades 18, 19, 20, and 21 overlapping each other. The shutter blades 13 to 21 each have a longitudinal direction that is substantially orthogonal to the moving direction.

A frame-shaped cover plate 23 is attached parallel to the frame-shaped shutter base plate 24 in the form of a frame via a plurality of spacers 22. Further, a frame-shaped partition plate 25 partitioning the first curtain 11 and the second curtain 12 is attached between the cover plate 23 and the shutter base plate 24, at an angle to the shutter base plate 24. The first curtain 11 is arranged between the cover plate 23 and the partition plate 25, and the second curtain 12 is arranged between the partition plate 25 and the shutter base plate 24.

A first curtain supporting arm 26 and a first curtain driving arm 27 are each engaged by a pin to one end (on the left side in FIG. 1) in the longitudinal direction of the shutter blades 13 to 17 constituting the first curtain 11. Likewise, a second curtain supporting arm 28 and a second curtain driving arm 29 are each engaged by a pin to one end in the longitudinal direction of the shutter blades 18 to 21 constituting the second curtain 12. The first curtain driving arm 27 and the second curtain driving arm 29 are each slidably engaged with arcuate guide grooves 30 and 31 that are formed in the cover plate 23 and the shutter base plate 24. Further, the proximal ends of the first curtain driving arm 27 and the second curtain driving arm 29 are coupled to a driving unit (not shown). The driving unit moves the first curtain driving arm 27 and the second curtain driving arm 29, thereby moving the first curtain supporting arm 26 and the second curtain supporting arm 28 in conjunction therewith. Thus, the shutter blades 13 to 17 and 18 to 21 are moved, so that the optical path is opened and closed.

The aforementioned configuration of the focal plane shutter unit 10 is merely an example. It is also possible to use a well-known configuration, for example, as disclosed in Japanese Patent Laid-Open No. 10-186448, Japanese Patent Laid-Open No. 2002-229097, or Japanese Patent Laid-Open No. 2003-280065.

Hereinafter, the configuration of the shutter blades 13 to 21 will be described in detail. At least one of the shutter blades 13 to 21 is a shutter blade composed of a fiber-reinforced laminate including a first fiber-reinforced layer, a second fiber-reinforced layer, and a metal layer provided between the first and second fiber-reinforced layers. Hereinafter, the shutter blade composed of this laminate will be referred to as a shutter blade according to this embodiment. A configuration in which each of the shutter blades 13 to 21 is composed of the shutter blade according to this embodiment leads to high durability and size reduction. However, the shutter blade according to this embodiment and other shutter blades may be used in combination for cost reduction. The shutter blade according to this embodiment having high strength can be used as a shutter blade that is likely to undergo collision. Specifically, the shutter blade according to this embodiment can be used as a shutter blade that moves a larger amount when the shutter is opened and closed. In the example of FIG. 1, the shutter blade according to this embodiment can be used as the shutter blades 13, 14, 20, and 21 that move a larger amount and are likely to undergo collision. Shutter blades that can be used in combination are not specifically limited, and a shutter blade made of an aluminum alloy plate material is an example thereof.

Figure 3:
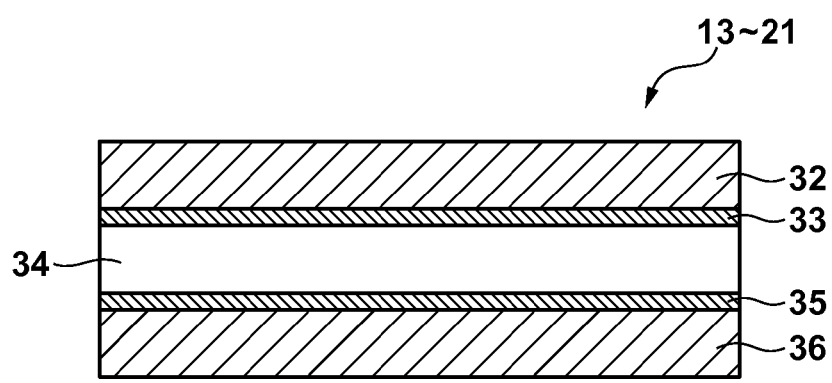
FIG. 3 is a cross sectional view of a shutter blade according to an embodiment.

FIG. 3 shows a cross sectional view of an example of the shutter blade according to this embodiment. The shutter blade shown in FIG. 3 is composed of a laminate including carbon fiber-reinforced resin layers 32 and 36, a metal layer 34 arranged between the carbon fiber-reinforced resin layers 32 and 36, and connecting layers 33 and 35 containing a metal oxide having the element of the metal layer and a resin composition (such as matrix resin) holding the fibers of the first fiber-reinforced layer and the second fiber-reinforced layer. It should be noted that three or more carbon fiber-reinforced resin layers may be laminated, or the shutter blade may have two or more metal layers. Further, the metal layer 34 is not necessarily in contact with the carbon fiber-reinforced resin layers 32 and 36, and other layers may be further laminated. The carbon fiber-reinforced resin has high smoothness, and can be used as a material of portions where the shutter blades contact each other. From this viewpoint, a surface of a shutter blade facing a subject or an imaging unit (for example, an imaging device or a film) is a carbon fiber-reinforced resin layer, in one embodiment.

The carbon fiber-reinforced resin layers 32 and 36 are not specifically limited as long as they are composed of a carbon fiber-reinforced resin. For example, a carbon fiber-reinforced resin containing epoxy resin can be used as a matrix. In the interest of ease of manufacturing, a prepreg sheet can be used. Specifically, use of a sheet obtained by impregnating carbon fiber layers with thermosetting epoxy resin, followed by semi-curing, can suppress the mesh opening.

Further, the sheet obtained by impregnating carbon fiber layers with thermoplastic resin also can be used as a material of the carbon fiber-reinforced resin layers 32 and 36. Use of a thermoplastic resin allows molding to be performed with a short heating time, as compared to the case of using a thermosetting resin, and therefore the carbon fiber-reinforced resin layers 32 and 36 can be obtained in a shorter time. Accordingly, the productivity of shutter blades can be improved.

It is desirable that durability with respect to repetitive driving is ensured by suppressing waving of the shutter blades during traveling and immediately after stopping when the shutter blades are driven to travel at a high shutter speed. Therefore, flexural rigidity that is necessary for this is required in order to use the fiber-reinforced laminate as a component of the shutter blades. The flexural rigidity of a fiber-reinforced resin is influenced by the fiber strength and the fiber amount in the resin. By increasing the fiber amount in the fiber-reinforced resin, the flexural rigidity of the fiber-reinforced resin is improved, and thus the durability of the shutter blades is also improved. From such a viewpoint, the volume fraction of fibers in the fiber-reinforced resin, that is, the volume fraction (Vf) of carbon fibers in the carbon fiber-reinforced resin layers 32 and 36, is at least 0.50 in one embodiment, and is at least 0.60 in a further embodiment.

Figure 4:
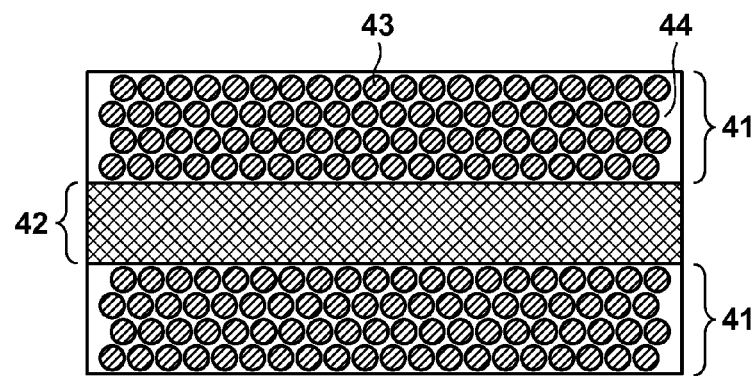
FIG. 4 is a view for explaining a volume fraction.

FIG. 4 shows a fiber-reinforced laminate including a metal layer 42 and fiber-reinforced layers 41. In FIG. 4, a fiber-reinforced layer 41 is composed of fibers 43 and a matrix resin 44. The volume fraction of the fibers 43 in the fiber-reinforced layer 41 corresponds to the volume fraction (Vf) of fibers in the fiber-reinforced resin.

On the other hand, the higher the volume fraction of the fibers in the fiber-reinforced resin, the more difficult it is to impregnate the fiber layer with the matrix resin without gaps. In one embodiment, a sheet obtained by impregnating a fiber layer with low molecular weight oligomers of a thermoplastic resin can be used as a material of the fiber-reinforced resin, so that the resin sufficiently penetrates the narrow portions of the gaps between the fibers even if the volume fraction (Vf) of the fibers is 0.50 or more. For example, a prepreg sheet obtained by impregnating carbon fibers that have been subjected to a predetermined sizing treatment with low molecular weight oligomers of a thermoplastic resin can be used.

In a thermoplastic resin, the viscosity increases as the degree of polymerization increases. In the case where the prepreg sheet is fabricated using a thermoplastic resin having a high degree of polymerization, it is possible to impregnate the fibers after reducing the viscosity of the thermoplastic resin by compression and/or heating. However, the thermoplastic resin still has a viscosity to some extent, and therefore, particularly in the case where the volume fraction of fibers is high, it is not easy to impregnate the fibers with the resin so that the resin penetrates uniformly thereinside. On the other hand, a thermoplastic resin in the form of low molecular weight oligomers has a low molecular weight, and thus has a comparatively low viscosity. Accordingly, in the case where the fiber layer is impregnated with low molecular weight oligomers having low viscosity, it is possible to allow the minimum necessary amount of the thermoplastic resin to penetrate into the fiber layer without generating voids. Therefore, even in the case where the volume fraction of the fibers is increased in order to obtain a shutter blade with higher performance, it is possible to obtain a fiber-reinforced resin having few internal defects.

In one embodiment, oligomers ranging from dimers to decamers are used as low molecular weight oligomers of the thermoplastic resin. The prepreg sheet obtained by impregnating the fiber layer with such low molecular weight oligomers has low molecular weight oligomers ranging from dimers to decamers at a first temperature T1 which are further polymerizable. The temperature T1 is a temperature at which low molecular weight oligomers melt so as to have a reduced viscosity, but the polymerization reaction does not proceed. At the temperature T1, the low molecular weight oligomers contained in the prepreg sheet further penetrate the gaps between the fibers. Further, an increase in temperature to a second temperature T2 that is higher than the first temperature T1 causes the polymerization reaction of low molecular weight oligomers to proceed. Thereafter, the thermoplastic resin is cured by cooling. As described above, the thermoplastic resin used in one embodiment has properties such that it remains in the form of low molecular weight oligomers having low viscosity at the first temperature T1, and undergoes a polymerization reaction at the second temperature T2.

In one embodiment, low molecular weight oligomers before the polymerization have a melt viscosity at the first temperature T1 of 10 mPa·s to 1000 mPa·s, and 10 mPa·s to 100 mPa·s in a further embodiment. The lower the melt viscosity, the easier it is for the low molecular weight oligomers to penetrate between the fibers of the prepreg sheet. As described above, the thermoplastic resin contained in the prepreg sheet before molding by compression and heating is in the form of low molecular weight oligomers dispersed in the gaps between the fibers, and the thermoplastic resin is transformed into polymers having a high polymerization degree after heating. In one embodiment, the polymers are higher than decamers.

In this way, use of a prepreg sheet containing low molecular weight oligomers having low melt viscosity is particularly advantageous when the metal layer has a surface treated layer having micro recesses. That is, since the low molecular weight oligomers easily enter into the micro recesses of the surface treated layer, stronger anchor points are formed between the fiber-reinforced layer and the metal layer. Therefore, the connection strength between the fiber-reinforced layer and the metal layer is further enhanced.

The prepreg sheet further contains a catalyst for the polymerization reaction so that the polymerization reaction proceeds easily. That is, the polymerization reaction does not proceed at the first temperature T1 even in the presence of the catalyst. On the other hand, the polymerization reaction of the low molecular weight oligomers proceeds in the presence of the catalyst at the second temperature T2, so that high molecular weight polymers are formed. That is, when compression molding is performed at the second temperature T2 so as to form the fiber-reinforced laminate, the low molecular weight oligomers constituting the thermoplastic resin contained in the prepreg sheet are polymerized in the presence of the catalyst, so that the fiber-reinforced layer is formed.

The matrix resin in the fiber-reinforced layer obtained as a result of the polymerization reaction of the low molecular weight oligomers by heating contains unreacted low molecular weight oligomers and high molecular weight polymers formed by the polymerization. In one embodiment, the low molecular weight oligomers have a melt viscosity that is 1/1000 or lower of the melt viscosity of the high molecular weight polymers. By having such a property, internal defects can be minimized and the strength of the fiber-reinforced layer can be ensured.

The type of the thermoplastic resin is not specifically limited, and examples thereof include cyclic polyester oligomers, cyclic polycarbonate oligomers, straight chain polyester, and straight chain polyamide. Specific examples thereof include cyclic oligomers of poly(butylene terephthalate) or cyclic oligomers of polyethylene terephthalate), and further specific examples thereof include cyclic oligomers of poly(butylene terephthalate) (poly(1,4-butylene terephthalate)). In the case of using cyclic oligomers of poly(butylene terephthalate) as the thermoplastic resin, the first temperature T1, for example, may be about 150 to 155° C., and the melt viscosity at the first temperature T1 can be about 20 mPa·s. Further, the second temperature T2, for example, can be about 200 to 205° C.

In order to improve the strength, carbon fiber-reinforced resin layers can be laminated so that, using carbon fiber-reinforced resin layers whose fiber directions are aligned in one direction, the fiber directions of all the carbon fiber-reinforced resin layers coincide with each other. Further, the carbon fiber-reinforced resin layers can be laminated so that the fiber directions of the carbon fiber-reinforced resin substantially coincide with the longitudinal direction of the shutter blade.

In the interest of improving the strength, the thickness of the carbon fiber-reinforced resin layers 32 and 36 exceeds 10 μm in one embodiment, and exceeds 15 μm in a further embodiment. When the thickness exceeds 10 μm, protrusion of the carbon fibers out of the resin is further prevented, and the strength is improved. Further, since lightweight properties and a size reduction of the shutter device can be achieved, the thickness of each of the carbon fiber-reinforced resin layers 32 and 36 is less than 80 μm in one embodiment, and 40 μm or less in a further embodiment.

The material of the metal layer 34 is not specifically limited. For example, materials conventionally used as a material of shutter blades can be used. The metal layer 34 can be a light metal layer that is lightweight and has a high specific strength. For example, an aluminum alloy or a magnesium alloy can be used as a material of the metal layer 34.

As the aluminum alloy, duralmin, super duralumin, or extra super duralumin can be used, for example, and extra super duralumin, which has higher rigidity, is used in one embodiment. As the magnesium alloy, Mg—Al—Zn, Mg—Zn—Zr, Mg—Li—Al, or Mg—Mn can be used, for example, and Mg—Al—Zn which can be rolled so that an elongated plate material is manufactured is used in one embodiment. For example, using the method disclosed in Japanese Patent Laid-Open No. 2002-348646, a magnesium alloy plate material of good quality, which is suitable for plastic working, having a thickness of 0.03 mm to 1.2 mm can be manufactured.

The thickness of the metal layer 34 can be appropriately set corresponding to the material to be used, and the thickness is more than 10 μm in one embodiment, and is 15 μm or more in a further embodiment, in the interest of improving the rigidity and planarity. When the thickness is more than 10 μm, the shutter blade can be better prevented from being damaged due to the blade warping when the blade travels at high speed and colliding with the shutter base plate 24 or the end face of the opening of the cover plate 23. Further, in view of the lightweight properties, the thickness is not more than 50 μm in one embodiment, and is not more than 30 μm in a further embodiment.

Further, the connecting layers 33 and 35 are provided between the metal layer 34 and the respective carbon fiber-reinforced resin layers 32 and 36. The connecting layers 33 and 35 may have surface treated layers such as anodized films or chemical conversion films. The surface treated layers improve the adhesion between the metal layer and the carbon fiber-reinforced resin layers as described above. The improvement of the adhesion causes an improvement in planarity of the shutter blade, and further causes an improvement in durability and environmental resistance. Further, the mesh opening in the carbon fiber-reinforced resin layers can be prevented by providing the surface treated layers.

Anodization can be performed according to a method generally used in the field of metal surface processing. Further, also for chemical conversion, a method generally used in the field of metal surface processing can be used.

The surface of the shutter blade may be subjected to further surface processing. For example, the surface of the shutter blade may be colored in black for antireflection. Examples of blackening methods include a method of applying black coating, and a method of depositing a black film, for example, by sputtering, vapor deposition, or plasma CVD.

The shutter blade according to this embodiment can be manufactured by forming anodized films or chemical conversion films constituting the connecting layers on the metal layer 34 and thereafter bonding the carbon fiber-reinforced resin layers 32 and 36 with the metal layer 34. For example, after the carbon fiber-reinforced resin layers and the metal layer are punched into the shape of the shutter blade, they can be laminated together. In this case, after the end face of the metal layer is subjected to a surface treatment such as blackening, the lamination can be performed. Alternatively, after the carbon fiber-reinforced resin layers and the metal layer are laminated, the laminate may be punched into the shape of the shutter blade. In this case, the end face of the metal layer can be subjected to a surface treatment such as blackening after punching. The punching method is not specifically limited, and wire cutting or press cutting can be used, for example. For example, press cutting is used in the interest of cost reduction.

The method for bonding the carbon fiber-reinforced resin layers 32 and 36 with the metal layer 34 is not specifically limited. For example, the carbon fiber-reinforced resin layers that are uncured or semi-cured are laminated with the metal layer, and thereafter resin is cured, thereby allowing the carbon fiber-reinforced resin layers to be bonded with the metal layer. In particular, a method in which a carbon fiber-reinforced resin containing a thermosetting resin is used and the resin is cured under compression and heating (hot pressing method) facilitates the manufacturing. It should be noted that the carbon fiber-reinforced resin layers may be bonded with the metal layer using an adhesive agent.

At this time, a micro roughness pattern can be provided on the surfaces of the prepreg sheets by allowing members having the micro roughness pattern on their surfaces to sandwich the prepreg sheets and the metal layer 34, and applying a pressure thereto. Thus, the aforementioned reflection reduction layers can be provided on the surfaces of the carbon fiber-reinforced resin layers 32 and 36 obtained from the prepreg sheets. That is, the reflection reduction layers can be provided by selecting a center line average roughness Ra of the reflection reduction layers so that the reflectance is sufficiently reduced, and forming a roughness pattern corresponding to the selected center line average roughness Ra on the surfaces of the carbon fiber-reinforced resin layers.

For example, a micro roughness pattern can be transferred to the surfaces of the prepreg sheets by using molds having the same center line average roughness Ra as the micro roughness pattern to be formed. In this case, a mold release agent can be applied to the molds so that the carbon fiber-reinforced resin layers 32 and 36 are easily separated from the molds. Alternatively, a micro roughness pattern can be transferred to the surfaces of the prepreg sheets by superimposing mold release sheets having the same center line average roughness Ra as the micro roughness pattern to be formed on the surfaces of the prepreg sheets, and applying a pressure thereto. The mold release sheets are not specifically limited, as long as they are easily separated from the matrix resin and have heat resistance to withstand the heating temperature. For example, PTFE sheets can be used therefor. In this case, there is no need to use the mold release agent.

A specific example of a method for forming the reflection reduction layer will be described below. First, mold release sheets such as PTFE sheets having the same center line average roughness Ra as the reflection reduction layer to be provided are superimposed on both surfaces of the laminate composed of the prepreg sheets and the metal layer 34. The thus obtained laminate is arranged between pressure plates of a hot press, which thereafter is subjected to molding at a temperature of 120 to 140° C. and a pressure of 0.1 to 0.5 MPa for one to two hours. In the case where a thermosetting resin is used as the matrix resin, the viscosity of the matrix resin that is uncured in the prepreg sheets is reduced, and the matrix resin flows into the micro recesses formed on the surfaces of the mold release sheets. Thereafter, the matrix resin is three-dimensionally crosslinked by a curing reaction, thereby allowing the micro roughness pattern of the mold release sheets to be transferred to the surfaces of the carbon fiber-reinforced resin layers. Thus, a shutter blade material having the reflection reduction layers formed on the surfaces of the carbon fiber-reinforced resin layers 32 and 36 can be fabricated. Also in the case where a thermoplastic resin is used as the matrix resin, the micro roughness pattern of the mold release sheets can be transferred to the surfaces of the carbon fiber-reinforced resin layers, in the same manner.

Further, the aforementioned friction reduction layers can be provided on the surfaces of the prepreg sheets by allowing members having recesses corresponding to the projections of the friction reduction layers on their surfaces to sandwich the prepreg sheets and the metal layer 34, and applying a pressure thereto. For example, mold release sheets such as PTFE sheets on which a plurality of recesses corresponding to the shapes of patterns A and B, which have been described with reference to FIG. 7, are formed are superimposed on the surfaces of the prepreg sheets. Thereafter, heating molding is performed in the same manner as in the case of forming the reflection reduction layers. Thus, a shutter blade material having the friction reduction layers formed on the surfaces of the carbon fiber-reinforced resin layers 32 and 36 can be fabricated.

In the case where the friction reduction layers are formed on both surfaces of the shutter blade, mold release sheets on which a plurality of recesses are formed can be superimposed on the prepreg sheets on both surfaces. Further, in the case where a friction reduction layer is formed on one surface of the shutter blade, a mold release sheet on which a plurality of recesses are formed can be superimposed on either one of the prepreg sheets, and a PTFE sheet having no recesses can be superimposed on the other prepreg sheet.

Further, it is also possible to provide both the reflection reduction layers and the friction reduction layers on the fiber-reinforced layers by further controlling the center line average roughness Ra of the mold release sheets on which the plurality of recesses corresponding to the projections of the friction reduction layers are formed.

In this embodiment, the matrix resin contained in the fiber-reinforced layers sandwiching the metal layer from both sides is prevented from flowing over the metal layer, as described above. Therefore, it is possible to prevent a shortage of the matrix resin that is necessary for forming the projections of the reflection reduction layer or the friction reduction layer in one fiber-reinforced layer, thus allowing the reflection reduction layer or the friction reduction layer to be formed with a higher reproduction ratio. Further, when the surface treated layers are provided on the metal layer, it is possible to prevent a shortage of the matrix resin necessary for exerting anchor effects by entering into the recesses of the surface treated layers, thereby allowing the adhesion between the metal layer and the fiber-reinforced layers to be improved.

Thereafter, heating of the hot press is stopped, followed by slow cooling. For example, after the hot press is cooled to 50° C. or lower, the fiber-reinforced laminate can be taken out. Thereafter, the mold release sheets on the surfaces are removed, thereby allowing a fiber-reinforced laminate having desired reflection reduction layers or friction reduction layers formed on the surfaces of the carbon fiber-reinforced resin layers 32 and 36 to be obtained. In this way, use of the mold release sheets can reduce the possibility of deposition of the mold release agent on the reflection reduction layers or the friction reduction layers, or the possibility of damage of the reflection reduction layers or the friction reduction layers.

The shutter device according to this embodiment, for example, can be used by being mounted on a camera. That is, the shutter device can be arranged in a camera including a housing, an optical system such as a lens, and an imaging unit such as an imaging device, so as to close a path of light that is incident on the imaging device, passing through the optical system.

EXAMPLES

Hereinafter, the embodiments of the present invention are described further by way of examples, but the present invention is not limited to these examples as long as it does not exceed the scope of the invention.

Example 1

A method for manufacturing a shutter blade according to Example 1 will be described below.

A carbon fiber prepreg sheet was punched to have a shape corresponding to the planar shape (the shape of a light incident surface) of the shutter blade before use. Here, the prepreg sheet was punched so that its fiber direction coincided with the longitudinal direction of the shutter blade. The thickness of the prepreg sheet was 15 μm.

As a metal layer, extra super duralumin that is aluminum alloy was used. The composition of the aluminum alloy used herein was 5.5 wt % zinc, 2.5% magnesium, 1.6% copper, and other unavoidable impurities, and the rest was aluminum. The aluminum alloy was also punched to have a shape corresponding to the planar shape (the shape of a light incident surface) of the shutter blade before use. The thickness of aluminum alloy was 15 μm.

First, surface treated layers that were at least a part of the aforementioned connecting layers were formed by subjecting the surfaces of the metal layer to anodization. Specifically, after a material was degreased, electrodes were arranged on both sides of the material so as to sandwich the material, which was subjected to anodization for 15 minutes under conditions of 15° C. and a current density of 1.5 A/dm$^2$, using sulfuric acid (200 g/L).

Further, the metal layer after the anodization was subjected to black staining using TAC BLACK-SLH (manufactured by Okuno Chemical Industries Co., Ltd.).

The thus obtained metal layer was sandwiched between two prepreg sheets. Then, it was subjected to hot pressing at a pressure of 0.5 MPa and a temperature of 60° C., thereafter 90° C., and thereafter 120° C. The fiber directions of the two prepreg sheets coincided with the longitudinal direction of the shutter blade. Then, black coating was applied to the outermost layers and end face of the laminate. Thus, a shutter blade was fabricated. FIG. 3 shows the configuration of the resultant shutter blade.

Example 2

A shutter blade was fabricated in the same manner as Example 1 except that the thickness of the metal layer was 20 μm, and the thickness of the prepreg sheet was 35 μm.

Example 3

In Example 3, magnesium alloy with a thickness of 15 μm was used as the metal layer. The composition of magnesium alloy used herein was 3 wt % aluminum, 1 wt % zinc, and other unavoidable impurities, and the rest was magnesium.

Surface treated layers were formed by subjecting the metal layer to chemical conversion. Specifically, using a chemical conversion liquid for magnesium, the chemical conversion was performed.

Using the metal layer after the chemical conversion and two prepreg sheets (with a thickness of 15 μm) prepared in the same manner as in Example 1, a shutter blade was fabricated in the same manner as in Example 1.

Example 4

A shutter blade was fabricated in the same manner as Example 3 except that the thickness of the metal layer was 20 μm, and the thickness of the prepreg sheet was 35 μm.

Evaluation of Shutter Blades

The durability, peel resistance, planarity, and light shielding properties of the shutter blades obtained in Examples 1 to 4 were evaluated. The durability was evaluated by assembling the shutter blades into a shutter, and allowing the shutter blades to travel at a curtain speed according to which a shutter speed of 1/8000 second could be achieved. The peel resistance was evaluated by making a cross-cut and conducting a tape peeling test.

TABLE 1

| Evaluated Items | | Ex. 1 | | Ex. 2 | |
|---|---|---|---|---|---|
| | | Prepreg Sheet [Mm] 15 | Al Alloy [Mm] 15 | Prepreg Sheet [Mm] 35 | Al Alloy [Mm] 20 |
| Durability Test | Tested At 1/8000 Sec | No Abnormality Occurred After At Least 300,000 Instances | | No Abnormality Occurred After At Least 300,000 Instances | |
| Tape Peeling Test | | 0/100 | | 0/100 | |
| Planarity | | Not More Than 0.1 mm | | Not More Than 0.1 mm | |
| Light Shielding Properties | | No Problem | | No Problem | |
| Evaluated Items | | Ex. 3 | | Ex. 4 | |
| | | Prepreg Sheet [Mm] 15 | Al Alloy [Mm] 15 | Prepreg Sheet [Mm] 35 | Al Alloy [Mm] 20 |
| Durability Test | Tested At 1/8000 Sec | No Abnormality Occurred After At Least 300,000 Instances | | No Abnormality Occurred After At Least 300,000 Instances | |
| Tape Peeling Test | | 0/100 | | 0/100 | |
| Planarity | | Not More Than 0.1 mm | | Not More Than 0.1 mm | |
| Light Shielding Properties | | No Problem | | No Problem | |

The shutter blades obtained in Examples 1 to 4 were confirmed to have sufficient light shielding properties.

Further, the shutter blades obtained in Examples 1 to 4 had planarity. It is thought that when the thickness of the prepreg sheet and the metal layer exceeds 10 μm as in Examples 1 to 4, the shutter blades have higher planarity.

Further, the shutter blades obtained in Examples 1 to 4 had durability. Based on these results, it is thought that when the thickness of the carbon fiber-reinforced prepreg sheet falls within the range of more than 10 μm but less than 80 μm, and the thickness of the metal layer falls within the range of more than 10 μm but less than 50 μm, durability can be obtained.

Further, since the shutter blades having the connecting layers, which were obtained in Examples 1 to 4, had higher peel resistance and adhesion, it is thought that peeling during use could be better prevented by providing the connecting layers between the metal layer and the prepreg sheets.

Example 5

As carbon fiber-reinforced resin layers constituting a shutter blade material, two CFRP prepreg sheets (manufactured by Mitsubishi Rayon Co., Ltd., product name: PYROFIL prepreg CFRP, thickness: 36 μm, recommended curing temperature: 130° C.) were prepared. In the carbon fiber-reinforced resin layers, continuous carbon fibers were aligned in one direction, and the main component was epoxy resin. In the carbon fiber-reinforced resin layers, the density of the carbon fibers was 1.81 g/cm$^3$, the density of the epoxy resin used as the matrix resin was 1.20 g/cm$^3$, and the content of the epoxy resin in the carbon resin reinforced resin was 30 wt %. The average density of the carbon resin reinforced resin as calculated was 1.63 (g/cm$^3$).

Next, as a light metal layer constituting an interlayer, an aluminum (Al) alloy sheet (A2024) composed of a rolled material was prepared. The density of the Al alloy sheet used in this example was about 2.77 g/cm$^3$. In order to achieve the thickness [T2] (μm) of the metal layer of less than T1×(ρ1/ρ2) (μm), the thickness of the Al alloy sheet needs to be less than 36×(1.63/2.77)=21.2 μm. Referring to the calculation results, a rolled Al alloy sheet material having a thickness of 21 μm was prepared.

The Al alloy sheet was subjected to a surface treatment. Specifically, the Al alloy sheet was first subjected to a treatment for degreasing its surfaces, and thereafter was subjected to anodization in a sulfuric acid solution adjusted to a concentration of 200 g/L and a bath temperature of 15° C. under conditions of a current density of 1.0 A/dm$^2$ and an electrolytic time of 10 minutes. Thereafter, staining was applied to the anodized film on the Al alloy sheet using TAC BLACK-SLH (manufactured by Okuno Chemical Industries Co., Ltd.).

Next, the Al alloy sheet and the CFRP prepreg sheets (CFRP) were stacked in the order of CFRP/Al alloy sheet/CFRP, so that a laminated sheet was prepared. Here, the CFRP prepreg sheets were arranged so that their fiber directions were parallel to each other, that is, so as to be symmetrical with respect to a plane. Further, PTFE sheets with a thickness of 50 μm were prepared as the mold release sheets, and were stacked on both surfaces of the laminated sheet. Thus, a layer structure of mold release sheet/CFRP/Al alloy sheet/CFRP/mold release sheet was obtained.

The thus obtained layer structure was set in a hot press, and thereafter the pressure was adjusted so that a pressure of 0.3 MPa was applied to the layer structure. Thereafter, under such a pressure, the hot press was heated to 130° C. from the room temperature at a temperature rise rate of 1.5° C. per minute, which was further maintained at 130° C. for two hours. Thereafter, heating the hot press was stopped, followed by slow cooling. After the layer structure temperature was confirmed to be 50° C. or less, the layer structure was taken out. Then, the mold release sheets arranged on the surface layers were removed. Thus, a laminated sheet for obtaining a camera shutter blade was obtained. In order to obtain a predetermined number of camera shutter blades, a plurality of laminated sheets were fabricated using the same method. Shutter blades having a predetermined shutter blade shape were punched out of the thus obtained laminated sheets by press punching. Thus, camera shutter blades were obtained.

Example 6

As carbon fiber-reinforced resin layers constituting a shutter blade material, two CFRP prepreg sheets (manufactured by Mitsubishi Rayon Co., Ltd., product name: PYROFIL prepreg CFRP, thickness: 32 μm, recommended curing temperature: 130° C.) were prepared. In the carbon fiber-reinforced resin layers, continuous carbon fibers were aligned in one direction, and the main component was epoxy resin. The average density of the carbon fiber-reinforced resin layers was 1.63 (g/cm$^3$) as in Example 5.

Next, as a light metal layer constituting an interlayer, an aluminum (Al) alloy sheet (A2024) composed of a rolled material was prepared. The density of the Al alloy sheet used in this example was about 2.77 g/cm$^3$. In order to achieve the thickness [T2] (μm) of the metal layer of less than T1×(ρ1/ρ2) (μm), the thickness of the Al alloy sheet needs to be less than 32×(1.63/2.77)=18.8 μm. Referring to the calculation results, a rolled Al alloy sheet material having a thickness of 18 μm was prepared. Further, the Al alloy sheet was subjected to a surface treatment, in the same manner as in Example 5. Thereafter, using the Al alloy sheet and the CFRP prepreg sheets, a shutter blade was fabricated in the same manner as in Example 5.

Example 7

As carbon fiber-reinforced resin layers constituting a shutter blade material, two CFRP prepreg sheets (manufactured by Mitsubishi Rayon Co., Ltd., product name: PYROFIL prepreg CFRP, thickness: 26 μm, recommended curing temperature: 130° C.) were prepared. In the carbon fiber-reinforced resin layers, continuous carbon fibers were aligned in one direction, and the main component was epoxy resin. The average density of the carbon fiber-reinforced resin layers was 1.63 (g/cm$^3$) as in Example 5.

Next, as a light metal layer constituting an interlayer, an aluminum (Al) alloy sheet (A2024) composed of a rolled material was prepared. The density of the Al alloy sheet used in this example was about 2.77 g/cm$^3$. In order to achieve a thickness [T2] (μm) of the metal layer that is less than T1×(ρ1/ρ2) (μm), the thickness of the Al alloy sheet needs to be less than 26×(1.63/2.77)=15.3 μm. Referring to the calculation results, a rolled Al alloy sheet material having a thickness of 15 μm was prepared. Further, the Al alloy sheet was subjected to a surface treatment, in the same manner as in Example 5. Thereafter, using the Al alloy sheet and the CFRP prepreg sheets, a shutter blade was fabricated in the same manner as in Example 5.

In this way, shutter blades were fabricated in Examples 5 to 7, so that the metal layer had a thickness [T2] (μm) of less than T1×(ρ1/ρ2)(μm). The shutter blades obtained in Examples 5 to 7 were confirmed to have sufficient durability and light shielding properties.

Example 8

As a metal layer constituting an interlayer, an aluminum (Al) alloy sheet (A2024, thickness: 22 μm) both surfaces of which were subjected to a surface treatment using a silane coupling agent was prepared. Further, as carbon fiber prepreg sheets, prepreg sheets (manufactured by Mitsubishi Rayon Co., Ltd., product name: PYROFIL prepreg CFRP) with a thickness of 30 μm in which continuous carbon fibers were aligned in one direction, and the matrix resin was epoxy resin were prepared. Next, the Al alloy sheet and the carbon fiber prepreg sheets (CFRP) were laminated in the order of CFRP/Al alloy/CFRP. Here, the CFRP prepreg sheets were arranged so that their fiber directions were in parallel to each other, that is, so as to be symmetrical with respect to a plane.

Then, the laminate was set in the hot press, and thereafter was subjected to heat-compression molding under conditions of a pressure of 0.3 MPa and a temperature of 130° C. for two hours, thereby allowing uncured epoxy resin contained in the prepreg sheets to be cured. Thus, the prepreg sheets and the Al alloy sheet were bonded. The thus obtained laminated sheet was subjected to press cutting. Thus, a sheet material in which a plurality of shutter blades were connected via marginal portions was obtained.

Subsequently, the end faces of the sheet material, constituting the profiles of the shutter blades, obtained by press cutting were subjected to anodization. Thus, porous anodized films were formed on the end faces of the shutter blades. Specifically, after the surfaces of the sheet material were degreased, anodization was performed using a sulfuric acid solution adjusted to a concentration of 200 g/L and a bath temperature of 15° C. under conditions of a current density of 1.5 A/dm$^2$ and an electrolytic time of 15 minutes.

Thereafter, staining was applied to the porous anodized films formed on the end faces constituting the profiles of the shutter blades using TAC BLACK-SLH (manufactured by Okuno Chemical Industries Co., Ltd.). Further, the marginal portions connecting the plurality of shutter blades were mechanically cut and removed. Thus, camera shutter blades were obtained. In this way, shutter blades in which blackening was applied at least to the outer circumference of the metal layer that includes the end faces exposed to light were fabricated.

Example 9

As a metal layer constituting an interlayer, an Al alloy sheet (A2024, thickness: 21 μm) was prepared in the same manner as in Example 8. Further, as carbon fiber prepreg sheets, prepreg sheets (manufactured by Mitsubishi Rayon Co., Ltd., product name PYROFIL prepreg CFRP) were prepared in the same manner as in Example 8. The Al alloy sheet and the prepreg sheets were each subjected to press cutting. Thus, an Al alloy sheet material and prepreg sheet materials in which a plurality of members having a shutter blade shape were connected via marginal portions were obtained.

Subsequently, the Al alloy sheet material obtained by press cutting was subjected to anodization. Thus, porous anodized films were formed on the surfaces and the end faces of the Al alloy sheet material. The same conditions of anodization as in Example 8 were used. Thereafter, staining was applied to the anodized films formed on the surfaces and the end faces of the Al alloy sheet material using TAC BLACK-SLH (manufactured by Okuno Chemical Industries Co., Ltd.).

Further, the Al alloy sheet material and the prepreg sheet materials (CFRP) subjected to staining were laminated in the order of CFRP/Al alloy/CFRP. Here, the CFRP prepreg sheets were arranged so that their fiber directions were in parallel to each other, that is, so as to be symmetrical with respect to a plane. The thus obtained laminate was set in the hot press, and thereafter was subjected to heat-compression molding under the same conditions as in Example 8, thereby allowing uncured epoxy resin contained in the prepreg sheets to be cured. Thus, the prepreg sheets and the Al alloy sheet were bonded. Thus, a sheet material in which a plurality of shutter blades were connected via marginal portions was obtained. Thereafter, the marginal portions connecting the plurality of shutter blades were mechanically cut and removed. Thus, camera shutter blades were obtained. In this way, shutter blades in which blackening was applied to the entire surfaces of the metal layer were fabricated.

The shutter blades obtained in Examples 8 and 9 were confirmed to have sufficient durability and light shielding properties.

Example 10

As a material of the carbon fiber-reinforced layers constituting the shutter blade material, carbon fiber prepreg sheets (thickness: 30 μm) in which continuous carbon fibers were aligned in one direction were prepared. The prepreg sheets contained cyclic oligomers of poly(butylene terephthalate) as a matrix resin. Further, the volume fraction (Vf) of carbon fibers in the prepreg sheets was adjusted to 0.50. Cyclic oligomers of poly(butylene terephthalate) were cyclic oligomers ranging from dimer to tetramer. The cyclic oligomers had polymerization reactivity, and were thermoplastic resin that was polymerizable under the temperature conditions described below. These cyclic oligomers had melt viscosity of 20 mPa·s, and the resin resulted from polymerization of the cyclic oligomers had melt viscosity of 100,000 mPa·s. Further, the matrix resin contained a catalyst to cause the ring-opening polymerization reaction of the cyclic oligomers of poly(butylene terephthalate) to proceed under the temperature conditions described below.

Next, as a light metal layer constituting an interlayer, an aluminum (Al) alloy sheet (A2024, thickness: 22 μm) composed of a rolled material was prepared. The Al alloy sheet was subjected to surface degreasing, anodization, and staining. The anodization was performed in a sulfuric acid solution adjusted to a concentration of 200 g/L and a bath temperature of 15° C. under conditions of a current density of 1.0 A/dm$^2$ and an electrolytic time of 10 minutes. The staining was performed using TAC BLACK-SLH manufactured by Okuno Chemical Industries Co., Ltd.

Next, the carbon fiber prepreg sheets and the Al alloy sheet were stacked so as to form a layer configuration of carbon fiber prepreg sheet/Al alloy sheet/carbon fiber prepreg sheet. Thus, a laminated sheet was prepared. Here, the two carbon fiber prepreg sheets were arranged so as to be symmetrical with respect to a plane, that is, so that their fiber directions were in parallel to each other. Further, PTFE sheets having a thickness of 50 μm were prepared as the mold release sheets, and the PTFE sheets were superimposed on both surfaces of the laminated sheet.

The die temperature of the hot press for curing and molding was set to 200° C. as a temperature T2 at which the ring-opening polymerization reaction of the cyclic oligomers of poly(butylene terephthalate) proceeds. Then, the laminated sheet was subjected to compression using the hot press under conditions of a pressure of 0.3 MPa for about one to two minutes, and was cooled for about one hour under pressure. Thereafter, the mold release sheets were removed. Thus, a fiber-reinforced laminate for obtaining a camera shutter blade was obtained.

By repeating the above steps, a plurality of fiber-reinforced laminates were fabricated. The thus obtained fiber-reinforced laminates were subjected to punching processing by pressing. Thus, camera shutter blades having a predetermined shape were fabricated. As the cross sections of the obtained shutter blades were observed using a SEM (scanning electron microscope), the resin penetrated the fibers. Further, the adhesion was evaluated using the cross-cut method in the same manner as in Examples 1 to 4. As a result, peeling from the laminates was not observed. Further, the durability test at a shutter speed of 1/8000 second was performed in the same manner as in Examples 1 to 4. As a result, no abnormalities occurred even after 300,000 instances of driving.

In the examples described above, a thermoplastic resin, the precursors of which were low molecular weight oligomers, was used as the matrix resin contained in the carbon fiber-reinforced layers, and the volume fraction of carbon fibers contained in the fiber-reinforced layers was at least 0.50. Such a configuration enabled the matrix resin to sufficiently penetrate the narrow portions between the carbon fibers in the state where the volume fraction of the carbon fibers was sufficiently high. Therefore, carbon fiber-reinforced layers having no defects such as voids could be formed. The shutter blades having such carbon fiber-reinforced layers had sufficient flexural rigidity. Further, as compared to the case where a thermosetting resin was used as the matrix resin, a significant reduction of the curing time was achieved. As a result, it was possible to significantly improve the productivity of the shutter blades, to suppress the waving of the shutter blades when they were driven and stopped to the minimum, and to provide a shutter device and a camera having excellent driving durability.

Example 11

As carbon fiber-reinforced resin layers constituting a shutter blade material, CFRP prepreg sheets (manufactured by Mitsubishi Rayon Co., Ltd., product name PYROFIL prepreg CFRP, thickness: 30 μm, single yarn diameter: 7 μm, recommended curing temperature: 130° C.) were prepared. In the CFRP prepreg sheets, continuous carbon fibers were aligned in one direction, and the main component of the matrix resin was epoxy resin.

Next, as a metal layer constituting an interlayer, an aluminum (Al) alloy sheet (A2024, thickness: 22 μm) composed of a rolled material was prepared. The Al alloy sheet was subjected to a treatment for degreasing its surfaces, and thereafter was subjected to anodization. The anodization was performed in a sulfuric acid solution adjusted to a concentration of 200 g/L and a bath temperature of 15° C. under conditions of a current density of 1.0 A/dm$^2$ and an electrolytic time of 10 minutes. Thereafter, staining was applied to porous films formed on the surfaces of the Al alloy sheet using TAC BLACK-SLH (manufactured by Okuno Chemical Industries Co., Ltd.).

Next, the Al alloy sheet and the CFRP prepreg sheets (CFRP) were stacked, so as to form a layer configuration of CFRP/Al alloy sheet/CFRP. Thus, a laminated sheet was prepared. Here, the CFRP prepreg sheets were arranged so as to be symmetrical with respect to a plane so that their fiber directions were parallel to each other. Further, PTFE sheets (thickness: 50 μm) having surfaces with a center line average roughness Ra of 40 nm were prepared as the mold release sheets, and were stacked on both surfaces of the laminated sheet, that is, on the CFRP prepreg sheets.

The thus obtained laminated sheet was set in the hot press, and thereafter a pressure of 0.3 MPa was applied thereto. In this state, the temperature was increased to 130° C. from the room temperature at a temperature rise rate of 1.5° C. per minute, which was maintained at 130° C. for two hours. Thereafter, heating the hot press was stopped, followed by slow cooling to a temperature of the laminated sheet not more than 50° C. Then, the laminated sheet was taken out. Thereafter, the mold release sheets arranged on the surface layers of the laminated sheet were removed. Thus, a fiber-reinforced laminate was obtained. The fiber-reinforced laminates were subjected to punching processing by pressing. Thus, a plurality of camera shutter blades having a predetermined shape were fabricated.

Example 12

The same CFRP prepreg sheets as in Example 11 were stacked so as to form a layer configuration of CFRP/CFRP/CFRP. Thus, a laminated sheet was prepared. At this time, the orientation directions of the carbon fibers herein were 0°/90°/0°. Further, PTFE sheets in which the center line average roughness Ra of the surfaces was not controlled were prepared as the mold release sheets, and were stacked on both surfaces of the laminated sheet. Then, under the same conditions as in Example 11, a fiber-reinforced laminate was obtained using the hot press. Further, black coating was applied to both surfaces of the fiber-reinforced laminate. Specifically, using CN50 manufactured by Tokyo Paint Co., Ltd., black coating films were formed on both surfaces of the laminated sheet so as to have a thickness of 5 μm per side. The fiber-reinforced laminates were subjected to punching processing by pressing. Thus, a plurality of camera shutter blades having a predetermined shape were fabricated.

Example 13

A fiber-reinforced laminate was fabricated in the same manner as in Example 11 except that ETFE sheets (thickness: 50 μm) having surfaces with a center line average roughness Ra of 5 nm were used as the mold release sheets. Further, a plurality of camera shutter blades were fabricated using the fiber-reinforced laminate in the same manner as in Example 11.

Various properties of the shutter blades obtained in Examples 11 to 13 were evaluated. Table 2 shows the evaluation results. The yield of good products concerning the planarity in the shutter blades obtained in Examples 11 and 13 was good as compared to Example 12. Here, the yield of good products concerning the planarity means the ratio of shutter blades having good planarity.

Further, the surface roughness of the reflection reduction layers formed on the surfaces of carbon fibers of the shutter blades obtained in Examples 11 to 13 was measured. Specifically, the center line average roughness Ra of the surfaces of the matrix resin formed on the surface of a single yarn (a single fiber) along the fiber direction of the carbon fibers was measured. Further, the optical reflectance of the shutter blades obtained in Examples 11 to 13 was measured using a spectrophotometer. FIG. 6 shows the measurement results.

TABLE 2

| | EX. 11 | EX. 12 | EX. 13 |
|---|---|---|---|
| Plate Thickness | 85 μm | 112 μm | 84 μm |
| Yield Of Good Products | 96% | 78% | 95% |
| Surface Reflectance (Wavelength: 550 nm) | 0.15% | 0.10% | 2.61% |
| Center Line Average Roughness Ra | 36.6 nm | Not Controlled | 4.9 nm |
| Image Evaluation | No Problem | No Problem | Deterioration Occurred in Image Quality |

As shown in FIG. 6, the reflectance of the shutter blades obtained in Example 11 was almost the same as the reflectance of the shutter blades obtained in Example 12 to which black coating was applied. Further, it was confirmed that the shutter blades obtained in Example 13 had a reflectance higher than the reflectance of the shutter blades obtained in Example 12 in the visible light region. Based on the aforementioned results, it was confirmed that the optical reflectance of shutter blades could be reduced by controlling the center line average roughness Ra of the reflection reduction layer on the surface of a single yarn of the carbon fibers. Specifically, it was confirmed that the optical reflectance of shutter blades could be sufficiently reduced by controlling the center line average roughness Ra of the reflection reduction layer to at least 10 nm.

Further, shutter devices to which the shutter blades obtained in Examples 11 to 13 were attached were installed in cameras, and captured images were evaluated. As a result, when the shutter blades obtained in Examples 11 and 12 were used, any significant deterioration in image quality due to optical reflection was not observed. On the other hand, when the shutter blades obtained in Example 13 were used, a reduction in image quality that was considered to be due to optical reflection on the surfaces of the shutter blades was observed.

As described above, planarity and light shielding properties required as shutter blades can be achieved by providing a metal layer as an interlayer, as in Example 11. Further, shutter blades in which the microscopic center line average roughness Ra and the surface reflectance of the surface layers of the fiber-reinforced layers are controlled can be fabricated.

Example 14

As carbon fiber-reinforced resin layers constituting a shutter blade material, CFRP prepreg sheets (manufactured by Mitsubishi Rayon Co., Ltd., product name: PYROFIL prepreg CFRP, thickness: 30 μm, recommended curing temperature: 130° C.) were prepared. In the CFRP prepreg sheets, continuous carbon fibers were aligned in one direction, and the main component of the matrix resin was epoxy resin.

Next, as a metal layer constituting an interlayer, an aluminum (Al) alloy sheet (A2024, thickness: 22 μm) composed of a rolled material was prepared. The Al alloy sheet was subjected to a treatment for degreasing its surfaces, and thereafter was subjected to anodization. The anodization was performed in a sulfuric acid solution adjusted to a concentration of 200 g/L and a bath temperature of 15° C. under conditions of a current density of 1.0 A/dm$^2$ and an electrolytic time of 10 minutes. Thereafter, staining was applied to porous films formed on the surfaces of the Al alloy sheet, using TAC BLACK-SLH (manufactured by Okuno Chemical Industries Co., Ltd.).

Next, the Al alloy sheet and the CFRP prepreg sheets (CFRP) were stacked so that the layer configuration of CFRP/Al alloy sheet/CFRP was obtained. Thus, a laminated sheet was prepared. Here, the CFRP prepreg sheets were arranged so as to be symmetrical with respect to a plane, so that their fiber directions were in parallel to each other. Further, PTFE sheets (thickness: 50 μm) in which recesses corresponding to the projections of the patterns A and B shown in FIG. 7 were provided were prepared as the mold release sheets, and were stacked on both surfaces of the laminated sheet, that is, on the CFRP prepreg sheets. Here, the projection of the pattern A had a diagonal line length of 300 μm in plan view and a height (protrusion length) of 7 μm. Further, the projection of the pattern B had a diameter of 400 μm in plan view and a height (protrusion length) of 4 μm. Further, the pitch between the projections of the pattern A and the projections of the pattern B was 250 μm.

The thus obtained laminated sheet was set in the hot press, and thereafter a pressure of 0.3 MPa was applied thereto. In this state, the temperature was increased to 130° C. from the room temperature at a temperature rise rate of 1.5° C. per minute, which was maintained at 130° C. for two hours. Thereafter, heating the hot press was stopped, followed by slow cooling to a temperature of the laminated sheet not more than 50° C. Then, the laminated sheet was taken out.

Thereafter, the mold release sheets arranged on the surface layers of the laminated sheet were removed. Thus, a fiber-reinforced laminate in which the friction reduction layers were formed was obtained. The fiber-reinforced laminates were subjected to punching processing by pressing. Thus, a plurality of camera shutter blades having a predetermined shape were fabricated.

The properties of the thus obtained shutter blades were evaluated. Table 3 shows the evaluation results. The yield of good products concerning the planarity of the shutter blades was 96%. In this way, it was confirmed that the shutter blades obtained in this example had good planarity. Further, using the shutter blades fabricated in this example as both the first curtain shutter blades and the second curtain shutter blades, a shutter device (focal plane shutter) as shown in FIG. 1 was fabricated, and a driving durability test was conducted thereto. The obtained shutter device had no problems even after 300,000 instances of opening and closing at room temperature and normal humidity. In this way, the shutter blades according to this example were confirmed to have sufficient durability as camera shutter blades. Further, the shutter device was checked after the driving durability test, and dust caused by the loss of the friction reduction layers was not observed. Further, the surfaces of shutter blades were observed using a microscope after the driving durability test, and any significant damage due to the loss of the friction reduction layers, due to slide marks, or the like, was not found.

TABLE 3

|  | EX. 14 | EX. 15 |
|---|---|---|
| Yield Of Good Products | 96% | 95% |
| Driving Durability Test (Tested At 1/8000 Sec) | No Abnormality Occurred After At Least 300,000 Instances | No Abnormality Occurred After At Least 300,000 Instances |
| Occurrence Of Dust | None | None |
| Occurrence Of Damage Such As Slide Marks | Not Observed | Not Observed |

Example 15

Camera shutter blades were obtained in the same manner as in Example 14 except that a PTFE sheet (thickness: 50 μm) provided with recesses corresponding to the projections of the patterns A and B shown in FIG. 7 was stacked on one surface of the laminated sheet. A PTFE sheet (thickness: 50 μm) provided with no patterns was stacked on the other surface of the laminated sheet.

The properties of the thus obtained shutter blades were evaluated. Table 3 shows the evaluation results. The yield of good products concerning the planarity of the shutter blades was 95%. In this way, it was confirmed that the shutter blades obtained in this example had good planarity. Further, using the shutter blades fabricated in this example as both the first curtain shutter blades and the second curtain shutter blades, a shutter device (focal plane shutter) as shown in FIG. 1 was fabricated, and a driving durability test was conducted thereto. At this time, the shutter blades were arranged so that the surface provided with the friction reduction layer and the surface having no patterns were in contact with each other. The obtained shutter device had no problems even after 300,000 instances of opening and closing at room temperature and normal humidity. In this way, the shutter blades according to this example were confirmed to have sufficient durability as camera shutter blades. Further, the shutter device was checked after the driving durability test, and dust caused by the loss of the friction reduction layers was not observed. Further, the surfaces of shutter blades were observed using a microscope after the driving durability test, and any significant damage due to the loss of the friction reduction layers, due to slide marks, or the like, was not found.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-001930, filed Jan. 8, 2014, No. 2014-070004, filed Mar. 28, 2014, and No. 2014-219698, filed Oct. 28, 2014, which are hereby incorporated by reference herein in their entirety.

What is claimed is:

1. A fiber-reinforced laminate comprising:
a first fiber-reinforced layer;
a second fiber-reinforced layer; and
a metal layer provided between the first fiber-reinforced layer and the second fiber-reinforced layer,
wherein connecting layers are interposed between the metal layer and the first fiber-reinforced layer, and between the metal layer and the second fiber-reinforced layer,
wherein the connecting layers are provided between the metal layer and fibers contained in the first fiber-reinforced layer, and between the metal layer and fibers contained in the second fiber-reinforced layer, and contain a resin composition layer that is formed by the same components as a resin composition holding the fibers of the first fiber-reinforced layer or the second fiber-reinforced layer, and is formed integrally with the resin composition holding the fibers of the first fiber-reinforced layer or the second fiber-reinforced layer,
wherein the metal layer has a surface layer provided with a surface treated layer having a plurality of micro recesses constituting a part of the connecting layers, and
wherein at least a part of the resin composition layer is embedded in the micro recesses of the surface treated layer.

2. The fiber-reinforced laminate according to claim 1, wherein the metal layer is made of a seamless metal sheet.

3. The fiber-reinforced laminate according to claim 1, wherein the metal layer is a base substrate that functions substantially as a core material of the first and second fiber-reinforced layers, and the first and second fiber-reinforced layers are reinforcement layers which enhance surface strength of the metal layer made of the base substrate.

4. The fiber-reinforced laminate according to claim 1, wherein an oxidized surface of the surface treated layer obtained by anodizing a surface of the metal layer forms an interface with the resin composition layer.

5. The fiber-reinforced laminate according to claim 1, wherein:
the first fiber-reinforced layer and the second fiber-reinforced layer are provided to have substantially the same thickness;
the first fiber-reinforced layer or the second fiber-reinforced layer is provided to have a thickness greater than or equal to a thickness of the metal layer; and
a total thickness of the first fiber-reinforced layer and the second fiber-reinforced layer is greater than the thickness of the metal layer.

6. The fiber-reinforced laminate according to claim 1, wherein the first fiber-reinforced layer has substantially the same fiber direction as a fiber direction of the second fiber-reinforced layer.

7. The fiber-reinforced laminate according to claim 1, wherein:
the fiber-reinforced laminate is a strip-shaped thin plate; and
the first and second fiber-reinforced layers are connected to the metal layer with a fiber direction of the first fiber-reinforced layer and a fiber direction of second fiber-reinforced layer being inclined from a longitudinal direction of the strip-shaped thin plate.

8. The fiber-reinforced laminate according to claim 7, wherein the fiber direction of the first fiber-reinforced layer and the fiber direction of the second fiber-reinforced layer intersect each other in plan view in a thickness direction of the strip-shaped thin plate.

9. The fiber-reinforced laminate according to claim 1, wherein:
the metal layer is a layer made of aluminum alloy or magnesium alloy; and
the first fiber-reinforced layer and the second fiber-reinforced layer are carbon fiber-reinforced resin layers.

10. The fiber-reinforced laminate according to claim 1, wherein:
the metal layer is composed of a rolled material;
fiber directions of the first fiber-reinforced layer and the second fiber-reinforced layer are aligned in one direction; and
the fiber directions of the first fiber-reinforced layer and the second fiber-reinforced layer intersect or are orthogonal to a rolling direction of the metal layer.

11. The fiber-reinforced laminate according to claim 1, wherein a volume fraction (Vf) of fibers in at least one of the first fiber-reinforced layer and the second fiber-reinforced layer is at least 0.50.

12. The fiber-reinforced laminate according to claim 1, wherein at least one of the first fiber-reinforced layer and the second fiber-reinforced layer has a friction reduction layer on its surface,
wherein the friction reduction layer has on its surface a plurality of first projections and a plurality of second projections, and
wherein the second projections have a height less than that of the first projections.

13. A fiber-reinforced laminate comprising:
a first fiber-reinforced layer,
a second fiber-reinforced layer,
a metal layer provided between the first fiber-reinforced layer and the second fiber-reinforced layer; and
connecting layers which bond the first and second fiber-reinforced layers and the metal layer,
wherein the connecting layers contain the same components as a resin composition which holds fibers in the first and second fiber-reinforced layers,
wherein the metal layer has a surface layer provided with a surface treated layer having a plurality of micro recesses constituting a part of the connecting layers;
wherein the surface treated layer is a blackened layer;
wherein the surface treated layer is further provided on an end face of the metal layer; and wherein the surface treated layer is a layer formed by subjecting a surface of the metal layer to anodization or chemical conversion.

14. A The fiber-reinforced laminate comprising:
a first fiber-reinforced layer;
a second fiber-reinforced layer; and
a metal layer provided between the first fiber-reinforced layer and the second fiber-reinforced layer,
wherein at least one of the first fiber-reinforced layer and the second fiber-reinforced layer has a reflection reduction layer on its surface; and
wherein the reflection reduction layer has a center line average roughness (Ra) of at least 10 µm as measured along a surface of a fiber contained in the first or second fiber-reinforced layer.

15. A shutter device comprising:
a base plate having an opening;
one or more shutter blades configured to open and close the opening, a longitudinal direction of the shutter blade being substantially orthogonal to its moving direction; and
a driving unit configured to drive the shutter blade,
wherein at least one of the one or more shutter blades is the fiber-reinforced laminate according to claim 1.

16. A camera comprising a shutter device, wherein the shutter device comprises:
a base plate having an opening;
one or more shutter blades configured to open and close the opening, a longitudinal direction of the shutter blade being substantially orthogonal to its moving direction; and
a driving unit configured to drive the shutter blade,
wherein at least one of the one or more shutter blades is the fiber-reinforced laminate according to claim 1.

* * * * *